(12) United States Patent
Takagi et al.

(10) Patent No.: US 8,085,294 B2
(45) Date of Patent: Dec. 27, 2011

(54) STEREOSCOPIC IMAGE DISPLAY APPARATUS

(75) Inventors: Ayako Takagi, Yokosuka (JP); Masako Kashiwagi, Yokohama (JP); Tatsuo Saishu, Tokyo (JP); Yuzo Hirayama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 500 days.

(21) Appl. No.: 12/404,612

(22) Filed: Mar. 16, 2009

(65) Prior Publication Data

US 2009/0244270 A1 Oct. 1, 2009

(30) Foreign Application Priority Data

Mar. 26, 2008 (JP) ................... 2008-081288

(51) Int. Cl.
*H04N 13/04* (2006.01)
(52) U.S. Cl. ........ 348/51; 348/42; 348/58; 348/E13.001
(58) Field of Classification Search ............ 348/42, 348/51, 58, E13.001; 356/367; 359/237
See application file for complete search history.

(56) References Cited

U.S. PATENT DOCUMENTS

| 7,336,360 | B2 * | 2/2008 | Oka et al. ............... 356/367 |
| 2007/0030551 | A1 * | 2/2007 | Oka et al. ............... 359/237 |

FOREIGN PATENT DOCUMENTS

| JP | 2004-198727 | 7/2004 |
| JP | 2006-189833 | 7/2006 |

OTHER PUBLICATIONS

Hoshino et al., "Analysis of Resolution Limitation of Integral Photography", Journal of the Optical Society of America, vol. 15, No. 8, pp. 2059-2065, (1998).

* cited by examiner

*Primary Examiner* — Quang N. Nguyen
(74) *Attorney, Agent, or Firm* — Finnegan, Henderson, Farabow, Garrett & Dunner, L.L.P.

(57) ABSTRACT

A stereoscopic image display apparatus includes: a plane display device; a lens array provided in front of the display surface to distribute light rays from pixels of the display device to predetermined angles, and having a plurality of lenses arranged in a first direction; a variable polarizer provided between the plane display device and the lens array to polarize light rays from the pixels; and a double refraction prism array provided on an opposite side of the lens array from the display device, and including a plurality of double refraction prisms. Each of the double refraction prisms has a ridge in a second direction perpendicular to the first direction and arranged in the first direction with a pitch which is substantially twice a lens pitch in the lens array, and has double refraction in which a refractive index in a ridge direction is different from a refractive index in a direction perpendicular to the ridge direction.

17 Claims, 18 Drawing Sheets

STEREOSCOPIC IMAGE DISPLAY APPARATUS

CROSS-REFERENCE TO RELATED APPLICATION

This application is based upon and claims the benefit of priority from prior Japanese Patent Application No. 2008-81288 filed on Mar. 26, 2007 in Japan, the entire contents of which are incorporated herein by reference.

BACKGROUND OF THE INVENTION

1. Field of the Invention

The present invention relates to a stereoscopic image display apparatus.

2. Related Art

The integral photography method (hereafter referred to as IP method) of displaying a large number of parallax images or the light ray reproduction method of recording a stereoscopic image by using any method and reproducing it as a stereoscopic image is known. It is supposed that an object is viewed with left and right eyes. When a point located at a short distance is viewed, an angle formed by the point and the left and right eyes is denoted by α. When a point located at a long distance is viewed, an angle formed by the point and the left and right eyes is denoted by β. The angles α and β vary depending upon the position relationship between the object and the viewer. The angle difference (α−β) is called binocular parallax. Human being is sensitive to the binocular parallax and is able to conduct stereoscopic viewing.

In recent years, development of stereoscopic image display apparatuses without glasses has been promoted. Many of them use the ordinary two-dimensional plane display device. Some optical plate is placed on the front or back of the plane display device, and the binocular parallax described above is utilized. Light rays can be made to appear to be projected from objects located several cm before and behind the plane display device when a viewer views the plane display device, by controlling angles of the light rays projected from the plane display device with the optical plate. This is because it has become possible to obtain an image which is high in definition to some degree even if light rays of the plane display device are distributed to several angles (called parallaxes), owing to implementation of the plane display device having a higher definition.

A three-dimensional image display method obtained by thus applying the IP method to a stereoscopic image display apparatus is called II (integral imaging) scheme. In the II scheme, light rays projected from one lens correspond to the number of element image groups, and the number is typically called number of parallaxes. In each lens, parallax light rays are projected in parallel. In the II scheme, the viewer views different images such as an image of one parallax, an image of two parallaxes, and an image of three parallaxes according to the position of the viewer or an angle of viewer's viewing.

Therefore, the viewer perceives a solid by parallax between the right eye and the left eye. In the case where a lenticular lens is used as the optical plate, there is a merit that the display is bright because the utilization efficiency of light is high as compared with the case where a slit is used. It is desirable that the spacing between the lens array and pixels is substantially equal to the focal length of the lens. By doing so, one pixel can be projected in one direction. The viewer can view a different parallax image according to the viewing angle.

If a solid is made to be reproduced in a position away from the display surface in the stereoscopic image display apparatus of the II scheme, then an assigned light ray flux spreads via an opening or a lens, resulting in a problem of abrupt falling of the resolution (see, for example, H. Hoshino, F. Okano, H. Isono and I. Yuyama, "Analysis of resolution limitation of integral photography," J. Opt. Soc. Am, A15 (1998), pp. 2059-2065.

In a stereoscopic image display apparatus which makes it possible to view a stereoscopic image without glasses, image information of a plane display device disposed on the back surface of an optical plate is assigned to respective parallax images. Therefore, the resolution falls as compared with the plane display device disposed on the back surface of the optical plate.

On the other hand, increasing the number of the parallax images is effective for improving the quality of the three-dimensional image, because it is possible to increase the viewing angle at which a normal stereoscopic image (three-dimensional image) can be viewed or to increase the far-side limit of the three-dimensional image position or the nearside limit of the three-dimensional image position. It is necessary to attempt to raise the resolution of the plane display device in order to increase the resolution, viewing angle, the far-side limit of the three-dimensional image position, and the nearside limit of the three-dimensional image position. However, there are restrictions because of the manufacturing cost.

Therefore, a stereoscopic image display apparatus in which the resolution is made high by displaying an image at a speed which is twice the conventional speed in a time direction, i.e., conducting time division display on the plane display device provided on the back surface of the optical plate is known. (JP-A2004-198727 and JP-A 2006-189833). In the display apparatus described in JP-A 2004-198727, two sheets of STN (Super-Twisted Nematic) arranged cells sandwiched between sheet polarizers are provided on the front surface of a liquid crystal panel, and the difference (transmission and interception) in retardation in the left and right eye direction is time-divided and changed over. The display apparatus described in JP-A 2006-189833 includes a display element having left eye video information and right eye video information, a video separator which separates incident light into a left eye video and a right eye video, a polarization conversion switch which converts the polarization direction of the incident light with time, and a one-layer double refraction element which transmits or refracts light according to a polarization direction of light passed through the polarization conversion switch. The resolution is improved by shifting the video converted in polarization direction by the polarization conversion switch through the double refraction element.

When conducting time division display by using the technique described in the above-described documents, there are the following problems.

First, the display apparatus described in JP-A 2004-198727 has a problem that the screen becomes dark because the light utilization efficiency becomes 50% if a scheme of repeating the interception and transmission of light fast is used.

Secondly, in the display apparatus described in JP-A 2006-189833, the viewing range is maximized and a stereoscopic image which is easy to view is obtained by providing parallax images in the direction of the viewer from all points in the screen when the eyes of the viewer is within the viewing zone width. When the viewer views a stereoscopic image, the viewing angle viewed by the viewer changes according to the position in the horizontal direction on the stereoscopic image display apparatus. In the stereoscopic image display apparatus, therefore, parallax images should be distributed around the normal direction of the plane display device in the central part of the screen. At ends of the screen, parallax images should not be distributed around the normal direction of the plane display device. When a line is drawn from the screen ends, the parallax images should be distributed around an angle of the vector direction of the line. When the directions of the light ray are distributed with time division, therefore, it becomes necessary that the accurate projection angles of parallax images can be calculated. This becomes especially important as the stereoscopic image display apparatus becomes large in size.

If accurate control in the parallax direction is not exercised, then a problem of occurrence of moiré, which changes in brightness according to the position, is posed.

Thirdly, in the case where the liquid crystal display apparatus is used in the plane display device which displays an elemental image or a changeover unit, it becomes important that the response rate of the liquid crystal is as fast as correspond to the time division display. In other words, the scheme of displaying 60 frames per second is typical at the present time. For conducting the two-division display in the time direction, therefore, 120 frames must be displayed per second. As for the response rate of the liquid crystal, therefore, the response of the liquid crystal must complete during 1/120=8.3 ms. If the response rate of the liquid crystal is slow, however, a former screen and a latter screen in the two-division display overlap each other and parallax images on respective display images overlap in the time direction. Since false parallax images are displayed in a direction which is not the original parallax direction, display degradation of the stereoscopic image such as blurring or a twin image occurs.

SUMMARY OF THE INVENTION

The present invention has been made in view of these circumstances, and an object of thereof is to provide a stereoscopic image display apparatus capable of reducing crosstalk between parallax images as far as possible even if time division display is conducted, preventing the luminance from decreasing as far as possible, and suppressing the display degradation of the stereoscopic image.

A stereoscopic image display apparatus according to an aspect of the present invention includes: a plane display device including a plurality of pixels arranged in a display surface; a lens array provided in front of the display surface to distribute light rays from the pixels to predetermined angles, the lens array having a plurality of lenses arranged in a first direction; a variable polarizer provided between the plane display device and the lens array to polarize light rays from the pixels; and a double refraction prism array provided on an opposite side of the lens array from the plane display device, the double refraction prism array including a plurality of double refraction prisms each having a ridge in a second direction perpendicular to the first direction and arranged in the first direction with a pitch which is substantially twice a lens pitch in the lens array, each of the double refraction prisms having double refraction in which a refractive index in the second direction is different from a refractive index in the first direction.

A stereoscopic image display apparatus according to another aspect of the present invention includes: a plane display device including a plurality of pixels arranged in a display surface; a lens array provided in front of the display surface to distribute light rays from the pixels to predetermined angles, the lens array having a plurality of lenses arranged in a first direction; a double refraction prism array provided on an opposite side of the lens array from the plane display device, the double refraction prism array including a plurality of double refraction prisms each having a ridge in a second direction perpendicular to the first direction and arranged in the first direction with a pitch which is substantially twice a lens pitch in the lens array, each of the double refraction prisms having double refraction in which a refractive index in the second direction is different from a refractive index in the first direction; and a first variable polarizer provided on an opposite side of the double refraction prism array from the lens array to polarize light rays from the double refraction prism array.

DESCRIPTION OF THE EMBODIMENTS

Hereafter, embodiments of the present invention will be described in detail with reference to the drawings.

First Embodiment

A stereoscopic image display apparatus according to a first embodiment of the present invention will now be described with reference to FIGS. 1 and 2.

Figure 1:
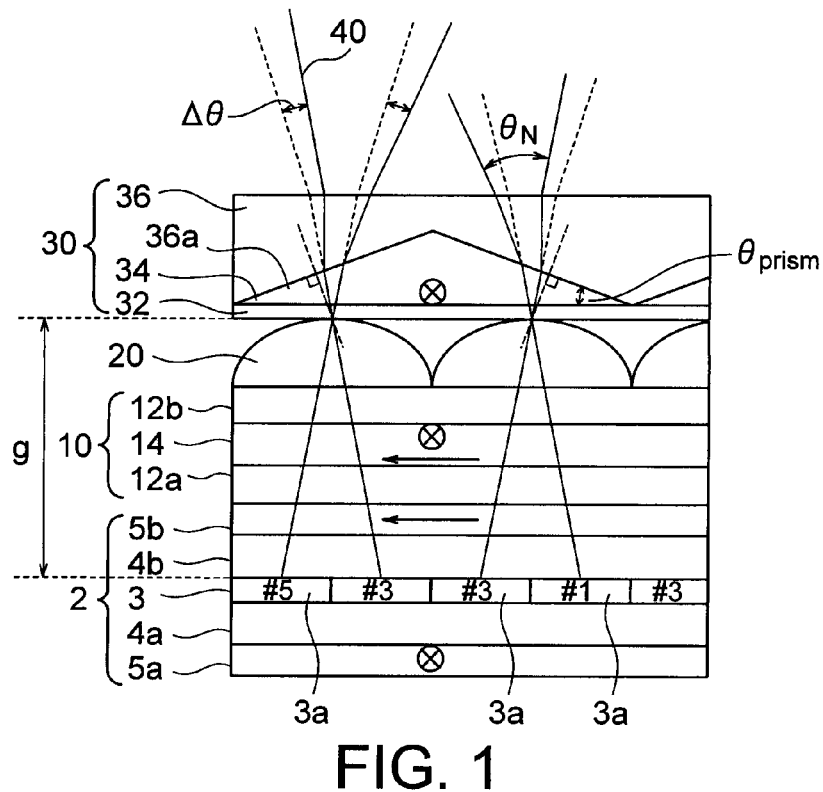
FIG. 1 is a horizontal sectional view showing one state of a stereoscopic image display apparatus according to a first embodiment of the present invention.

FIG. 1 shows a horizontal section of the stereoscopic image display apparatus according to the present embodiment. The stereoscopic image display apparatus according to the present embodiment includes a plane display device 2, a variable polarization cell 10, a lens array 20 serving as an optical plate, and a double refraction prism array 30.

The plane display device 2 is, for example, a liquid crystal display device. The plane display device 2 includes a display part 3 having pixels 3a arranged in a matrix form, one pair of transparent substrates 4a and 4b provided so as to have the display part therebetween, and vertical polarizers (sheet polarizers) 5a and 5b respectively provided on surfaces of the transparent substrates 4a and 4b opposite to the display part 3. The vertical polarizer 5a is different in light polarization direction by 90 degrees from the vertical polarizer 5b. The liquid crystal display device may be either of the reflection type and the transmission type. A polarizer sheet is disposed on the top surface of a liquid crystal panel to control the gradation, and polarization directions are already aligned. The polarization direction is made to coincide with the same direction as the ridge of the lens array 20 disposed in the front of the liquid crystal panel, or made to coincide with a direction obtained by inclining the direction of the ridge. Since the inclination of the lens array 20 is determined by the relationship to the pixel, the inclination of the lens array 20 does not always coincide with the polarization plane of the liquid crystal panel. As in the present embodiment, therefore, the vertical polarizers 5a and 5b rotated in polarization plane by a constant quantity in order to make the polarization direction coincide with the inclination of the lens ridge are provided on the outside of the liquid crystal panel. In a typically known method, the polarization direction can be rotated by making the major axis direction of the λ/2 plate coincide with a predetermined direction. In the present embodiment, the liquid crystal display device is used as the plane display device. Alternatively, a display device other than the liquid crystal display device, such as an organic EL display device or a plasma display device, can be used. If a display device other than the liquid crystal display device is used as the plane display device in the present embodiment, then a device for aligning the polarization direction is not provided on the display surface of the display device, and consequently it is necessary to place a sheet polarizer on the display surface and thereby align the polarization direction with the maximum main axis direction of the double refraction prism array 30. In general, placing the polarizer sheet brings about darkness. If a display device other than the liquid crystal display device is used, therefore, it is necessary to make the brightness of the display device brighter.

The variable polarization cell 10 includes a pair of transparent substrates 12a and 12b, and a variable polarizer 14 containing a material which changes in polarization direction according to an AC voltage applied via the transparent substrates 12a and 12b. The variable polarization cell 10 is provided between the plane display device 2 and the lens array 30. When an AC voltage is not applied, the variable polarization cell 10 changes the polarization direction of a light ray incident on the variable polarization cell 10 by 90 degrees and makes the light ray projection. When an AC voltage is applied, the variable polarization cell 10 causes the light ray incident on the variable polarization cell 10 to project as it is without changing the polarization direction of the light ray. As an example of the variable polarization cell 10, a cell obtained by storing OCB liquid crystal, which can be driven fast between the transparent substrates 12a and 12b made of glass or plastics, can be mentioned. Since OCB liquid crystal having a response rate of 8 ms is already known, two polarization directions can be made variable by turning on and off a voltage in, for example, one-frame time (1/60 s=16.6 ms). FIG. 1 shows a state in which the polarization direction (indicated by arrows) of incident light rotates by 90 degrees when a voltage is not applied to the variable polarization cell 10.

The lens array 20 has a plurality of lenses arranged in parallel. A parallax image can be provided at a desired angle by placing an elemental image corresponding to each lens at a focal length. As for the material of the lens array, it is desirable to have an isotropic refractive index because it is desirable to pass the light ray while keeping the polarization direction in one direction.

The double refraction prism array 30 includes a transparent lower substrate 32 provided on the front of the lens array 20, a transparent upper substrate 36 provided on and in contact with the lower substrate 32 so as to have a groove 36a taking the shape of a triangular prism (taking the shape of a triangle in the sectional view shown in FIG. 1), and a double refraction substance 34 inserted into the groove 36a. By the way, the upper substrate 36 has the groove 36a taking the shape of a triangular prism on the lower substrate 32 side, and consequently the upper substrate 36 serves as a prism. One surface of the groove 36a is inclined at an angle $\theta_{prism}$ with respect to the lower substrate 32. Herein, the angle $\theta_{prism}$ is referred to as base angle of the prism 36.

In the present embodiment, the lens pitch of the isotropic lens array 20 is made equal to approximately twice the pitch of the groove 36a of the upper substrate 36, and each of valley parts (each of boundaries between lenses) in the lens array 20 is made to substantially coincide with a mountain part or a valley part of the groove 36a of the upper substrate 30. Since it is desirable that the double refraction prism array 30 is close to the lens array 20, it is desirable that the lower substrate 32 of the double refraction prism array 30 is thin. The reason will now be described. If the lower substrate 32 is thick, then a light ray flux which has passed through one lens is incident from the boundary part of the lens array 20 on the upper substrate 36 having adjacent opposite inclinations, and bendings in a direction opposite to the direction in which the original light ray bends. As a result, blurring or a twin image called crosstalk occurs, resulting in display degradation.

The best-known double refraction substance is calcite. The liquid crystal also has double refraction property. In the liquid crystal, molecules take a long and narrow shape. Anisotropy of the refractive index occurs in the lengthwise direction of the molecule called director. For example, many of molecules in nematic liquid crystal are long and narrow-shaped molecules. The major axis directions of them are aligned and oriented. However, position relationships of the molecules are random.

Although it is said that the orientation directions of molecules are aligned, they are not parallel perfectly and there is fluctuation (represented by an order parameter S) to some degree because the atmosphere in use is not at absolute zero degree. If a local area is seen, however, it can be said that the molecules surface substantially one direction. Supposing an area which is sufficiently small when macroscopically viewed, but which is sufficiently large as compared with the size of liquid crystal molecules, the orientation direction of an average molecule in that area is represented by a unit vector. The unit vector is referred to as director or orientation vector. An orientation in which the director becomes substantially parallel to the substrate is called homogeneous orientation. One of greatest features of the liquid crystal is optical anisotropy. Especially since the degree of freedom of molecule arrangement is high as compared with other anisotropic media such as crystal, the difference in refractive index between the major axis and the minor axis which is a standard of the double refraction property.

The major axis direction of the double refraction substance is aligned with the ridge direction of the lens array 20, i.e., the ridge direction of the groove 36a taking the shape of the triangular prism. For example, if liquid crystal is used as the double refraction substance, liquid crystal molecules can be arranged in a definite direction by applying an orientation film to surfaces of the lower substrate 32 and the upper substrate 36 in contact with the liquid crystal and conducting orientation processing on respective surfaces in the ridge direction of the groove 36a.

As an example, there is rubbing. Orientation films are applied to surfaces of transparent substrates having the liquid crystal between, and processing of "rubbing" the orientation films in the definite direction is conducted.

The principle of time division drive in the stereoscopic image display apparatus according to the present embodiment will now be described. In FIG. 1, a viewer views a stereoscopic image from an area which is the opposite side of the double refraction prism array 30 from the lens array 20, and the plane display device 2 is projected by backlight (not shown) from the opposite side of the plane display device 2 from the variable polarization cell 10. In the state shown in FIG. 1, an AC voltage is applied to the variable polarization cell 10 and thereby the polarization direction of a light ray 40 incident on the double refraction prism array 30 from the backlight side is rotated by 90 degrees. A resultant state is shown in FIG. 2. The direction of the light ray 40 projected from the double refraction prism array 30 is shifted by a minute angle Δθ by changing over the polarization angle. A plurality of parallax images can be displayed in the time direction by changing over the state shown in FIG. 1 and the state shown in FIG. 2 alternately fast in the time direction. In other words, FIG. 1 shows a state of a former half of one frame whereas FIG. 2 shows a state of a latter half of the frame. Light rays indicated by broken lines in FIG. 1 represent light rays in the state shown in FIG. 2.

A refractive index of the double refraction substance 34 in the major axis direction is denoted by ne, and a refractive index of the double refraction substance 34 in the minor axis direction is denoted by no. When a light ray having a polarization plane travels in the double refraction substance 34, the refractive index "ne" in the major axis direction is revealed if the polarization direction of the light ray is aligned with the major axis direction whereas the refractive index "no" in the minor axis direction is revealed if the polarization direction of the light ray is aligned with the minor axis direction. In the present embodiment, it is supposed that the major axis of liquid crystal 34a is oriented in the ridge direction of the groove 36a taking the shape of the triangular prism in the upper substrate 36. The refractive index "ne" in the major axis direction of the double refraction substance 34 is revealed, when the light ray has a polarization plane in the ridge direction of the groove 36a. The refractive index "no" in the minor axis direction is revealed, when the light ray has a polarization plane in a direction perpendicular to the ridge direction of the groove 36a. Therefore, in the state shown in FIG. 1, i.e., in the state in which an AC voltage is not applied to the variable polarization cell 10, therefore, the light ray which has passed through the variable polarization cell 10 is polarized in the ridge direction of the groove 36a, and consequently the refractive index "ne" in the major axis direction of the double refraction substance 34 is revealed. In the state shown in FIG. 2, i.e., in the state in which an AC voltage is applied to the variable polarization cell 10, therefore, the light ray which has passed through the variable polarization cell 10 is polarized in a direction perpendicular to the ridge direction of the groove 36a, and consequently the refractive index "no" in the minor axis direction of the double refraction substance 34 is revealed. In FIG. 3, the lower substrate 32 in the double refraction prism array 30 is omitted. In FIG. 3, reference character 35a denotes a major axis direction in which the refractive index is maximized in the double refraction substance (liquid crystal in FIG. 3), and reference character 35b denotes a minor axis direction in which the refractive index is minimized in the double refraction substance.

If a refractive index n of the upper substrate (prism) 36 is smaller than the refractive index "ne" in the major axis direction of the double refraction substance 34, then the parallax light ray shifts in the mountain side direction of the prism 36. This will now be described.

The case where the bottom surface of the prism 36 (a surface of the double refraction substance 34 side) has an inclination angle with respect to the lower substrate 32 that the bottom surface rises as the position proceeds to the right (the case of the left half of the prism 36 shown in FIG. 1) as shown in FIG. 1 will now be considered. If the refractive index n of the prism 36 is smaller than the refractive index "ne" of the double refraction substance 34, then the direction of the light ray 40 in the prism 36 shifts in a direction in which the thickness of the prism 36 becomes small. Therefore, the direction of the parallax ray changes in the right direction in FIG. 1, i.e., in the direction of the vertex of the double refraction prism array 30. The case where the bottom surface of the prism 36 has an inclination angle with respect to the lower substrate 32 that the bottom surface falls as the position proceeds to the right (the case of the right half of the prism 36 shown in FIG. 1) will now be considered. In this case as well, the direction of the light ray 40 in the prism 36 shifts in a direction in which the thickness of the prism 36 becomes small, in the same way.

Therefore, the direction of the parallax light ray changes in the left direction in FIG. 1, i.e., in the direction of the vertex of the double refraction prism array 30.

In other words, under the condition n<ne, the parallax light ray shifts in the direction of the vertex of the prism as shown in FIG. 1. In the first part of the prism having the lower surface which rises as the position advances to the right and the second part of the prism having the lower surface which falls as the position advances to the right, therefore, the shift directions become opposite to each other. As a result, the same parallax image cannot be applied as elemental images corresponding to the first and second parts.

The parallax image presented to pixels of the plane display device will now be described. When viewed from the position of the viewer, presentation positions of the parallax image are supposed to be a #1 parallax image, a #2 parallax image, a #3 parallax image, a #4 parallax image and a #5 parallax image in the order from the left. It is also supposed that the parallax image presentation positions in the case where there is no difference in refractive index in the double refraction prism array 30 are the #2 parallax image and the #4 parallax image. In a pixel area corresponding to the first part of the prism 36 having the lower surface which rises as the position advances to the right, the presentation position of the parallax image shifts in the right direction and the #3 parallax image and the #5 parallax image can be presented. In a pixel area corresponding to the second part of the prism 36 having the lower surface which falls as the position advances to the right, the presentation position of the parallax image shifts in the left direction and the #1 parallax image and the #3 parallax image can be presented.

By the way, it is also possible to provide the whole lower surface of the prism 36 with a sawtooth shape which rises as the position proceeds to the right. In the case of the stereoscopic image display, however, light rays which are off the axis not only in the direction of the front of the display device which is the optical axis direction of the lens array 20 but also in the oblique direction are used as parallax images. If light rays in the oblique direction pass through the boundary part, then the incidence direction is shallow and consequently reflection occurs. Since the refraction direction is also different utterly from the original angle of the prism, the light ray direction becomes abnormal. Thereafter, the pitch of the prism 36 is made substantially twice the pitch of the lens array 20 to implement a prism having a gentle mountain type state. Even if the parallax ray does not pass through the original position of the prism 36 which rises to the right or falls to the right, but passes through an adjacent prism which falls to the right or rises to the right, therefore, errors of the parallax light ray are suppressed to the minimum.

Figure 2:
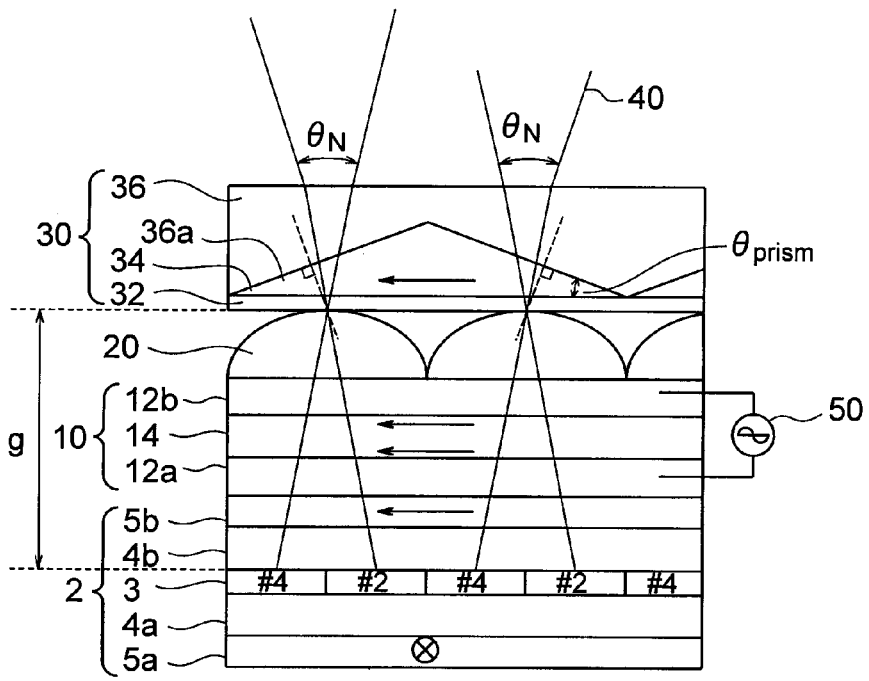
FIG. 2 is a horizontal sectional view showing another state of the stereoscopic image display apparatus according to the first embodiment.
Figure 3:
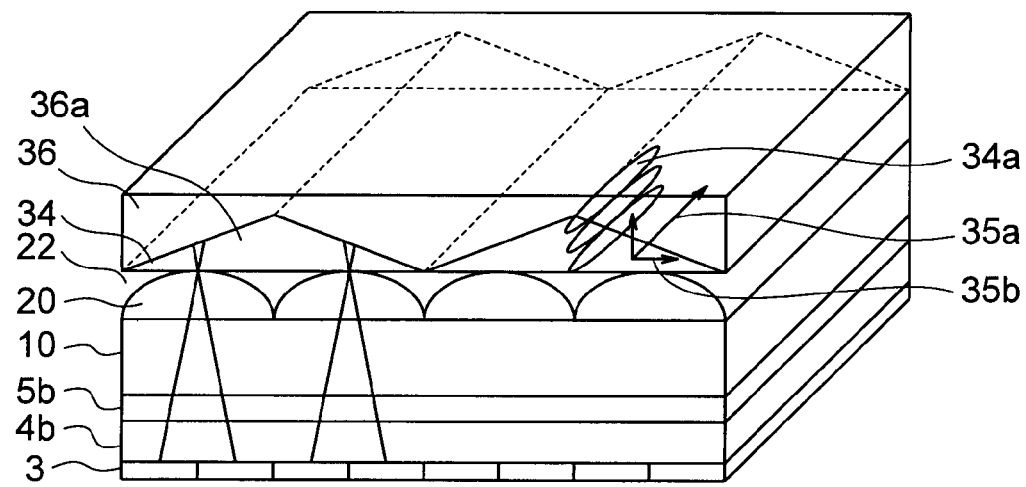
FIG. 3 is a diagram for explaining the revelation of the refractive index of a double refraction substance in the major axis direction and the minor axis direction.

The direction of the parallax light ray 40 obtained when an AC voltage 50 is applied to the variable polarization cell 10 becomes as shown in FIG. 2. In the variable polarization cell 10, the polarization direction of the incident light ray is maintained as it is. The parallax light ray, which has passed through the lens array 20, has a polarization direction parallel to the paper in the double refraction prism array 30. The case where the major axis of the liquid crystal 34a is oriented in the ridge direction of the prism 36 as shown in FIG. 3 will now be considered. Since the refraction index "no" in the minor axis direction is revealed when the light ray has a polarization plane perpendicular to the ridge direction of the lens, the refractive index in FIG. 2 becomes "no". If the refractive index n of the prism 36 coincides with the refractive index "no", then the light ray travels in the same direction as the direction of incidence to the prism 36.

Figure 4:
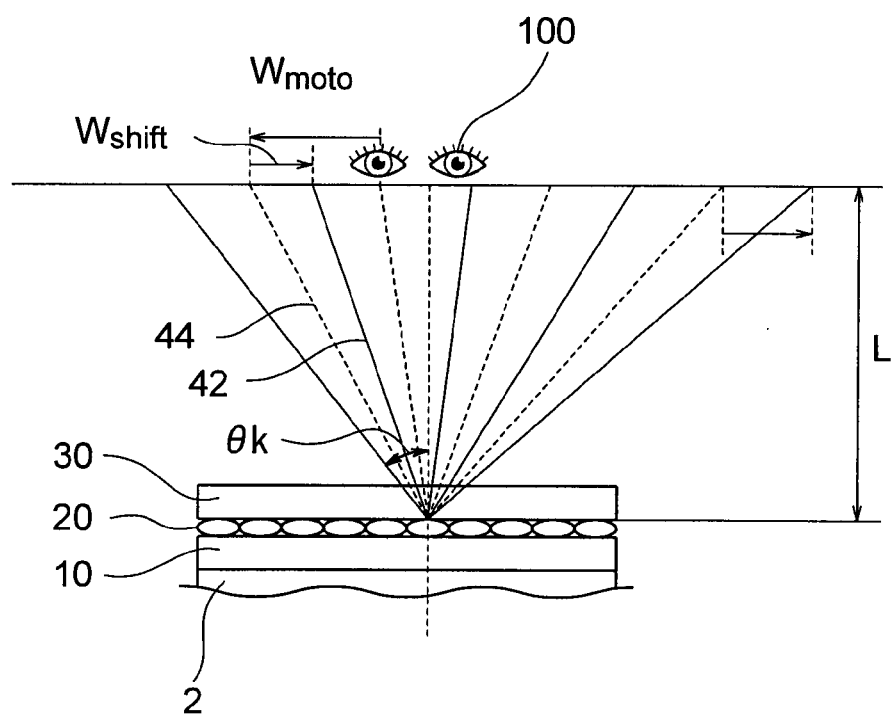
FIG. 4 is a diagram for explaining an interpolation position of adjacent parallax images.

An optimum value of the projection direction of the light ray at the time of time division drive will now be described with reference to FIG. 4. In FIG. 4, the stereoscopic display apparatus including the double refraction prism array 30, the lens array 20, the variable polarization cell 10 and the plane display device 2 and a viewer 100 who is in a viewing distance are shown.

First, a selection range of the refractive index of the double refraction prism array 30 and an optimum value of the base angle $\theta_{prism}$ of the prism 36 are found.

If the double refraction prism array 30 is not placed, then the stereoscopic image display apparatus is supposed to have a viewing angle 2θ and the number of parallaxes N. It is also supposed that the double refraction substance 34 in the double refraction prism array 30 has a higher refractive index "ne" and a lower refractive index "no" and the base angle of the prism 30 is $\theta_{prism}$. Supposing that liquid crystal which is inexpensive and easy in manufacturing is used as the double refraction substance 34, values of the refractive index "ne" in the major axis direction and the refractive index "no" in the minor axis direction become substantially constant, and consequently the base angle $\theta_{prism}$ has the highest degree of freedom. It is supposed that the refractive index of the upper substrate (prism) 36 in the double refraction prism array 30 is n.

Figure 5:
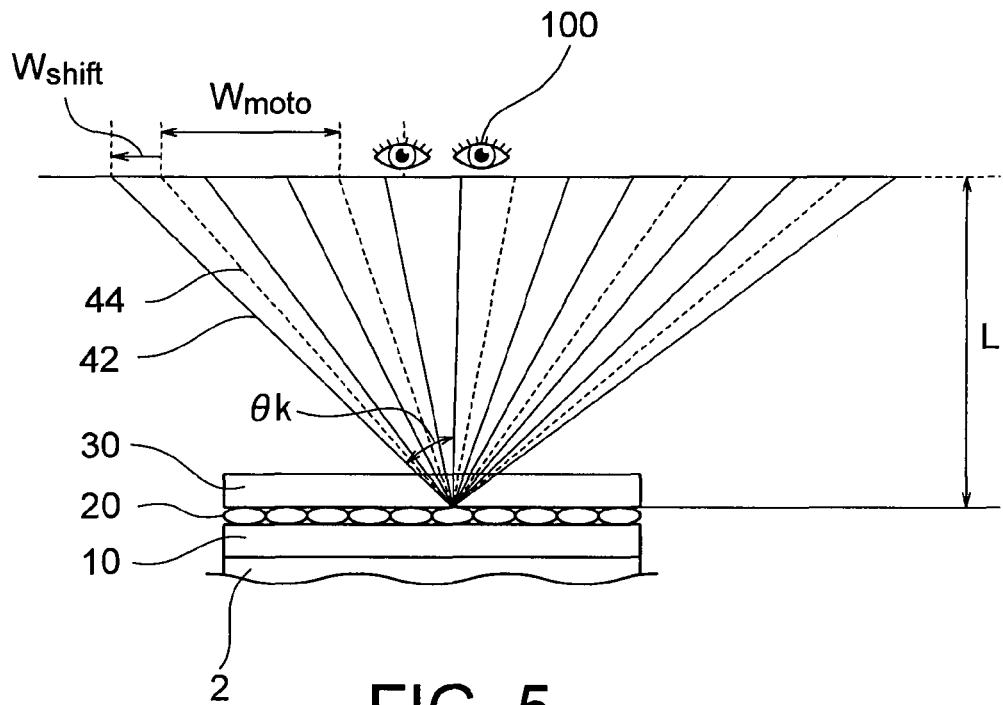
FIG. 5 is a diagram for explaining an interpolation position of adjacent parallax images.

In the present embodiment, two kinds shown in FIG. 4 and FIG. 5 are conceivable as interpolation positions between adjacent parallax images.

FIG. 4 and FIG. 5 are views obtained by seeing the stereoscopic image display apparatus according to the present embodiment from the above.

First, the refractive index n of the prism 36 is made equal to one of the two refractive indexes "ne" and "no" of the double refraction substance 34 in the double refraction prism array 30. By doing so, the parallax light ray is not refracted when the light ray is polarized in a first direction by the variable polarization cell 10, whereas the parallax light ray is shifted by half of the distance between adjacent parallax light rays when the light ray is polarized in a second direction which differs from the first direction by 90 degrees. In other words, the light ray is not refracted by the prism 36 when n=no or n=ne. The condition n=no or n=ne is not realistic because of restrictions on the material. As a result of vigorous studies conducted by the present inventors, it has been appreciated that similar effects can be obtained as long as the range satisfies the following expression (1) or (2). |A| represents an absolute value of A.

When no<ne, $$|n-no| < 0.1 \times (ne-no) \tag{1}$$

$$|n-ne| < 0.1 \times (ne-no) \tag{2}$$

The conditions represented by the expressions (1) and (2) correspond to the states shown in FIG. 1 and FIG. 2, respectively. A light ray 44 indicated by a broken line represents a parallax light ray in the case where the refractive index n of the prism 36 is the same as the refractive index "ne" of the double refraction substance 34. The light lay 44 corresponds to the case where the AC voltage is applied to the variable polarization cell 10 in the present embodiment, i.e., the state shown in FIG. 2. A light lay 42 corresponds to the case where the AC voltage is not applied to the variable polarization cell 10 in the present embodiment, i.e., the state shown in FIG. 1. The parallax light ray 44 is also a light ray in the case where the double refraction prism array 30 is not provided.

As shown in FIG. 4, a distance between centers of adjacent parallax light rays in a viewing distance L (a distance between the position of the viewer 100 and the front surface of the lens array 20) in the case where the double refraction prism array 30 is not provided is denoted by Wmoto. A shift quantity at the viewing distance between a light ray direction in the case where the AC voltage is not applied to the variable polarization cell 10 and a light ray direction in the case where the projection angle is changed by the prism is denoted by Wshift. It is desirable that the following relationship is satisfied.

$$W\text{shift} = W\text{moto}/2 \quad (3)$$

Figure 6:
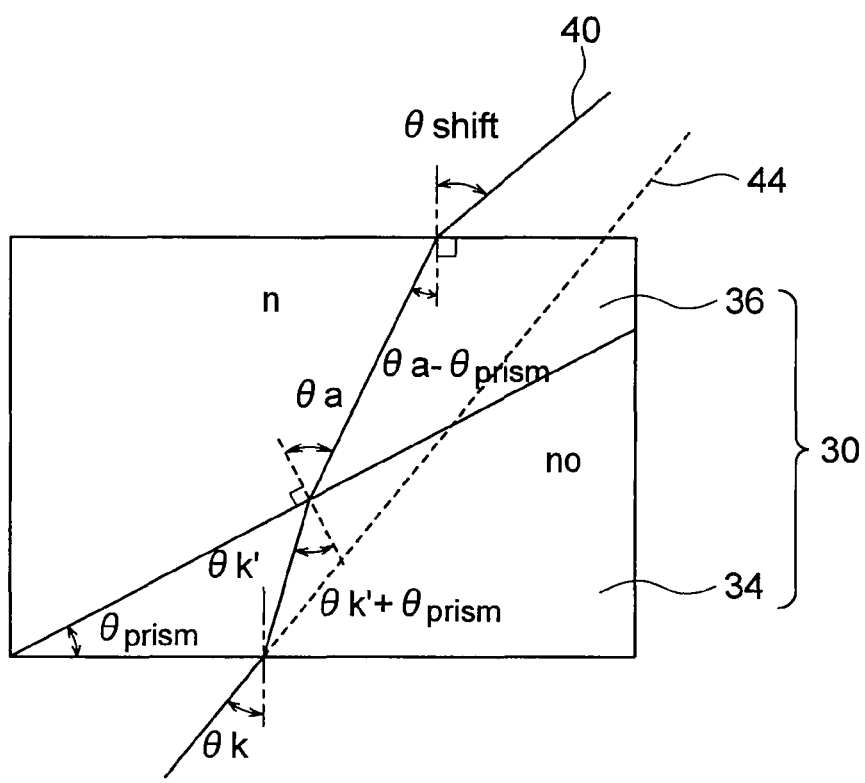
FIG. 6 is a diagram showing how a light ray travels in a double refraction prism array according to an embodiment of the present invention.

An optimum base angle $\theta_{prism}$ of the prism 36 under the condition of the expression (1) will now be derived with reference to FIG. 6. Herein, A sin stands for arcsin. In FIG. 6, a light ray 40 indicates a light ray refracted in the double refraction prism array 30. A light ray 44 indicates a light ray in the case where the double refraction prism array 30 is not provided. In FIG. 6, $\theta_k$ denotes an incidence angle of the light ray 40 incident on the double refraction substance 34, whereas $\theta_{k'}$ denotes a refraction angle of the light ray 40 refracted by the double refraction substance 34. As a result, an incidence angle of the light ray 40 incident on an interface between the double refraction substance 34 and the prism 36 becomes $\theta_{k'} + \theta_{prism}$. At this time, the refraction angle of the light ray 40 refracted by the prism 36 becomes $\theta_a$. An incidence angle of the light ray 40 incident on an interface between the prism 36 and air 22 becomes $\theta_a - \theta_{prism}$, and a refraction angle at this time is denoted by $\theta_{shift}$. As described later with reference to FIG. 15, the incidence angle $\theta_k$ becomes equal to the viewing angle of the viewer 100. As appreciated from FIG. 6, the following equations are obtained:

$$\sin\theta_k = \sin\theta_{k'} \times no$$

$$\theta_{k'} = A\sin(\sin\theta_k/no)$$

$$\sin(\theta_{k'} + \theta_{prism}) \times no = \sin\theta_a \times n$$

Therefore, the following equation is obtained:

$$\begin{aligned}\theta_a &= A\sin(\sin(\theta_{k'} + \theta_{prism}) \times no/n) \\ &= A\sin(\sin(A\sin(\sin\theta_k/no) + \theta_{prism}) \times no/n)\end{aligned}$$

From FIG. 6, the following equation is obtained:

$$\sin(\theta_a - \theta_{prism}) \times n = \sin\theta_{shift}$$

Therefore, a refraction angle $\theta_{shift}(no)$ at an interface between the prism 36 and the air obtained when the light ray incident on the double refraction substance 34 is polarized in the minor axis direction of the double refraction substance by the variable polarization cell 10 becomes:

$$\begin{aligned}\theta_{shift}(no) &= A\sin(\sin(\theta_a - \theta_{prism}) \times n) \\ &= A\sin(\sin(A\sin(\sin(A\sin(\sin\theta_k/no) + \theta_{prism}) \times \\ & \quad no/n) - \theta_{prism}) \times n)\end{aligned} \quad (4)$$

A refraction angle $\theta_{shift}(ne)$ at the interface between the prism 36 and the air obtained when the light ray incident on the double refraction substance 34 is polarized in the major axis direction of the double refraction substance by the variable polarization cell 10 becomes:

$$\theta_{shift}(ne) = A\sin(\sin(A\sin(\sin(A\sin(\sin\theta_k/ne) + \theta_{prism}) \times \\ ne/n) - \theta_{prism}) \times n) \quad (5)$$

The expression (5) is an expression in the case where the bottom surface of the prism 36 shown in FIG. 6 rises to the right. If the bottom surface falls to the right, calculation should be conducted by regarding the base angle $\theta_{prism}$ as a negative value. As regards the incidence angle $\theta_k$ as well, the expression (5) can cope with all cases by regarding clockwise with respect to a downward perpendicular line of the bottom surface of the double refraction substance 34 as positive and regarding counterclockwise as negative and thereby unifying the positive and negative cases.

Figure 7:
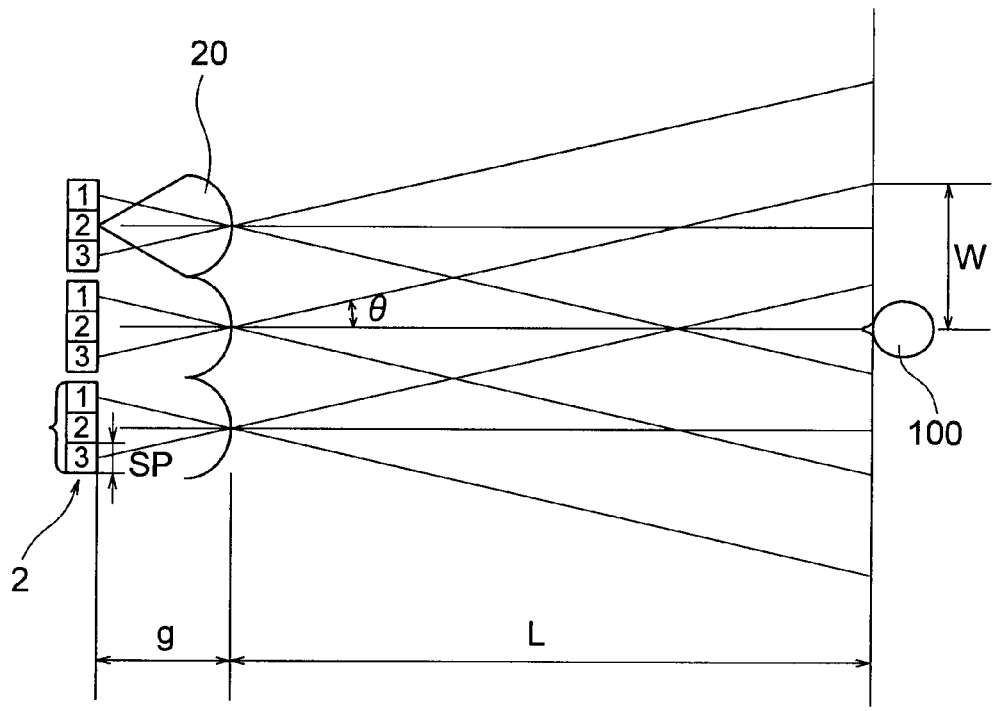
FIG. 7 is a diagram for explaining projection of light rays in an integral imaging display.

A plan view of the stereoscopic image display apparatus according to the present embodiment is shown in FIG. 7. In FIG. 7, the variable polarization cell 10 and the double refraction prism array 30 are omitted. It is supposed that the number of parallaxes is N, the viewing angle is 2θ, and the subpixel pitch is sp on the stereoscopic image display apparatus according to the present embodiment. From FIG. 7, a gap g between the lens array 20 and a pixel of the plane display device 2 is represented by the following expression.

$$\tan\theta = N \times sp/g \quad (6)$$

Therefore, a viewing width W at the viewing distance L is represented by the following expression.

$$W = L \times \tan\theta$$

Supposing that images of N parallaxes are distributed therein, distances Wmoto and Wshift between centers of one parallax image are represented as follows:

$$W\text{moto} = L \times \tan\theta/N \quad (7a)$$

$$W\text{shift} = L \times \tan\theta_{shift}(ne) \quad (7b)$$

Since it is desirable that Wmoto and Wshift shown in FIG. 4 have the relationship (3), the expression (3) is modified as:

$$W\text{shift} = 0.5 \times W\text{moto}$$

Substituting the expressions (7a) and (7b) into the above-described expressions, we get:

$$L \times \tan\theta/(N)/(L \times \tan\theta_{shift}(ne)) = 0.5$$

$$\tan\theta/(N)/\tan\theta_{shift}(ne) = 0.5$$

$$\tan\theta_{shift}(ne) = \tan\theta/(N)/0.5 \quad (8)$$

$\theta_{prism}$ should be selected so as to satisfy $\theta_{shift}(ne) = A\sin(\sin(A\sin(\sin(A\sin(\sin\theta_k/ne) + \theta_{prism}) \times ne/n) - \theta_{prism}) \times n)$.

As a matter of fact, however, if an observation angle $\theta_k$ increases, the shift quantity of the presentation position increases according to the Snell's law. If within the observation angle $\theta_k$ the presentation position is made to be contained in the allowable range between parallax images before providing the double refraction prism array 30, therefore, the display degradation in the observation angle can be reduced.

The following allowable limit is provided for the expression (8). If the stereoscopic image display apparatus is viewed from a certain visual point and Wshift/Wmotor deviates from 0.5, i.e., the value of Wshift is small, then luminance in an angle direction in the case where a shift is caused is superposed more on luminance in an angle direction visible in the case where a shift is not caused, and consequently the luminance appears to be increased. At a certain visual point position, therefore, the luminance looks different from area to area in the stereoscopic image display apparatus, resulting in moiré. If an allowable limit of the degree to which moiré is not caused is provided as a reference of the allowable limit, then the range represented by the following expression is obtained.

$$0.4 < W\text{shift}/W\text{motor} < 0.6$$

Accordingly, the following expression is obtained by rewriting the expression (8):

$$0.4 < \tan\theta/(N)/\tan\theta_{shift}(ne) < 0.6 \quad (9)$$

Figure 21:
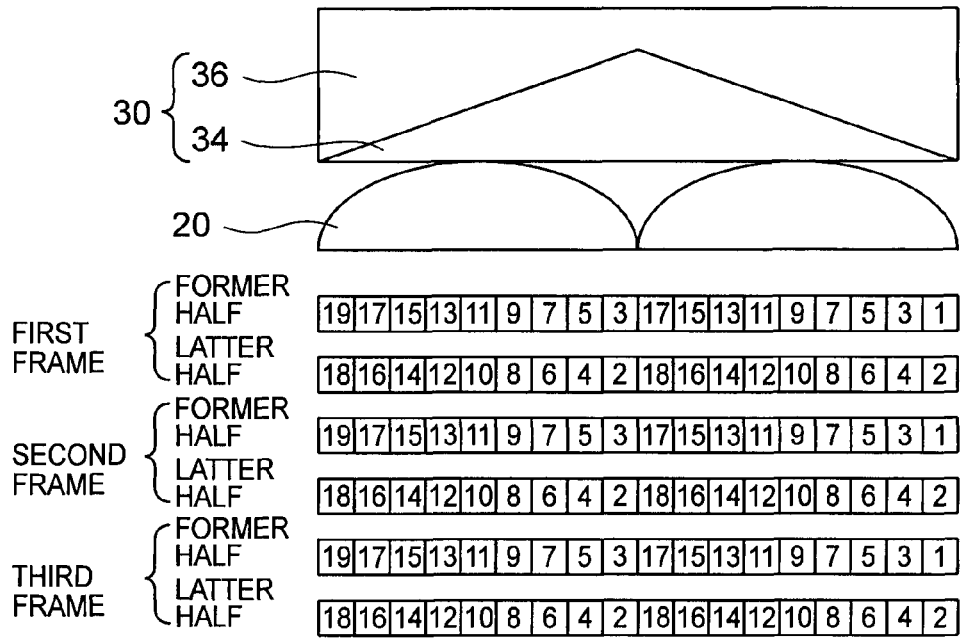
FIG. 21 is a diagram showing one presentation example of parallax images in the first embodiment.

In other words, ne, no, n and $\theta_{prism}$ are determined so as to satisfy the expressions (1) and (9). A presentation example of parallax images in each frame in this case is shown in FIG. 21.

Figure 8:
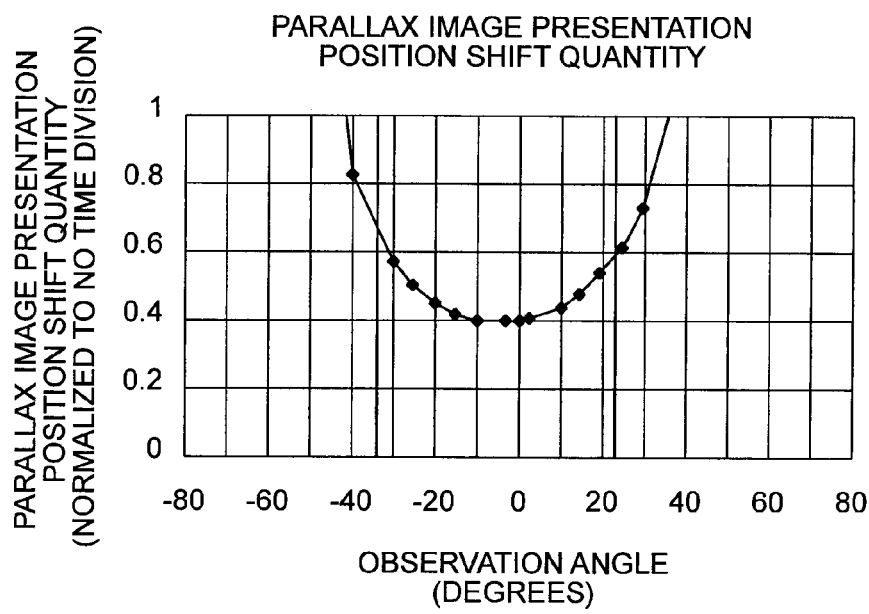
FIG. 8 is a diagram showing relationships between a viewing angle and a position shift value.

Supposing that the number N of parallaxes is 9 and half $\theta$ of the viewing angle is 45 degrees in the present embodiment, dependence of the presentation position shift quantity upon the observation angle $\theta_k$ is shown in FIG. 8. In FIG. 8, left and right shaded parts are regions where the expression (9) is not satisfied. As appreciated from FIG. 8, a parallax image can be presented with little display degradation caused by moiré when the observation angle $\theta_k$ is in the range of −32 to 22 degrees.

An optimum base angle $\theta_{prism}$ of the prism 36 under the condition indicated by the expression (2), i.e., $$|n-ne| < 0.1 \times (ne-no)$$

will now be derived.

When no<n and supposing that a direction of a shift into the direction of the vertex of the double refraction prism array is positive, the value of the expression (4):

$$\theta_{shift}(no)(=A\sin(\sin(A\sin(\sin(A\sin(\sin\theta_k/no)+\theta_{prism})\times no/n)-\theta_{prism})\times n)) \text{ is a negative value.}$$

For making the shift quantity caused by the refractive index "no" equal to approximately half of that between adjacent parallax images, therefore, the following relationship should be satisfied:

$$-0.6 \leq \tan\theta/(N)/\tan\theta_{shift}(no) \leq -0.4 \quad (10)$$

So as to satisfy the expressions (2) and (10), ne, no, n and $\theta_{prism}$ are determined.

Figure 22:
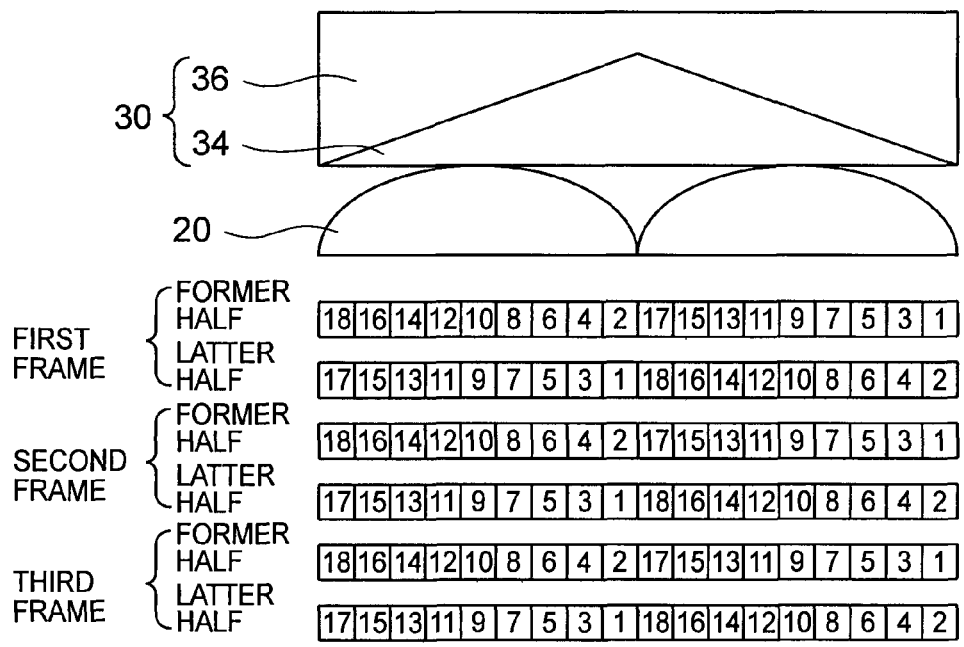
FIG. 22 is a diagram showing another presentation example of parallax images in the first embodiment.

A presentation example of parallax images in each frame in this case is shown in FIG. 22.

The case where the parallax image is shifted in the present embodiment will now be described.

First, the parallax image is shifted by ¼ and −¼ of the distance between parallax images. As regards "ne" and "no" of the double refraction prism array 30, therefore, one of the refraction indexes is made larger than the refraction index n of isotropy of the prism 36, and the other of the refraction indexes is made smaller than n. As a result, shift directions become opposite to each other.

Figure 9:
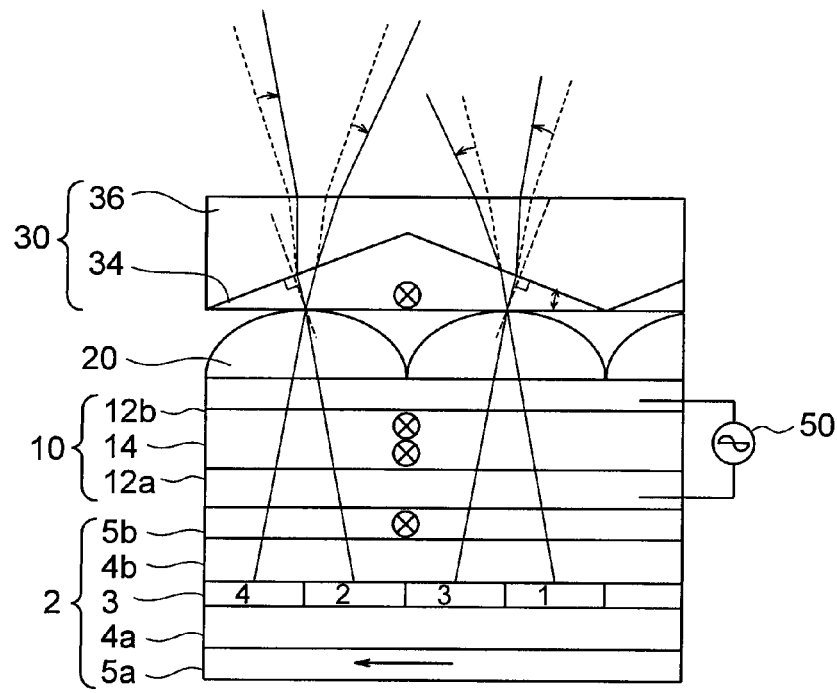
FIG. 9 is a horizontal sectional view showing another state in the first embodiment.

FIG. 9 shows the case where the refractive index of the prism 36 is ne. In the case shown in FIG. 9, the major axis of the double refraction substance 34 is aligned with the direction of the ridge of the prism, and the polarization plane is aligned with the ridge direction of the prism 36 by the variable polarization cell 10. As appreciated from FIG. 9, a shift is caused so as to approach the vertex of the prism as compared with the case where the double refraction prism array 30 is not provided. A light ray before the shift is indicated by a broken line, whereas a light ray after the shift is indicated by a solid line. In FIG. 9, the lower substrate 32 in the double refraction prism array 30 shown in FIG. 1 is omitted in illustration.

Figure 10:
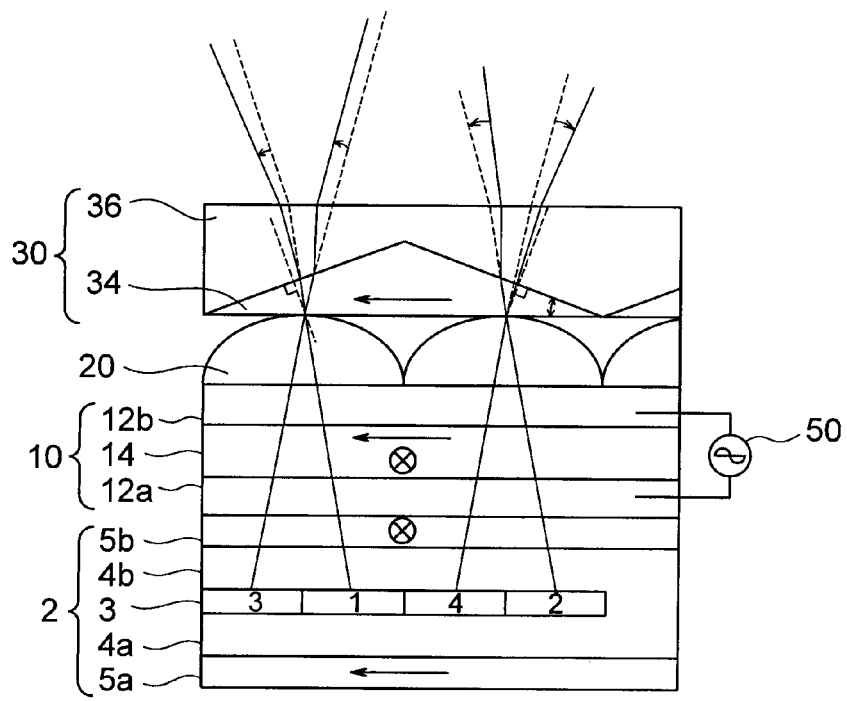
FIG. 10 is a horizontal sectional view showing another state in the first embodiment.

FIG. 10 shows the case where the refractive index of the prism 36 is no. In the case shown in FIG. 10, the major axis of the double refraction substance 34 is aligned with the direction of the ridge of the prism 36, and the polarization plane is aligned with a direction obtained by rotating the ridge direction of the prism 36 by 90 degrees by the variable polarization cell 10. As appreciated from FIG. 10, a shift is caused so as to go away from the vertex of the prism 36 as compared with the case where the double refraction prism array 30 is not provided. A light ray before the shift is indicated by a broken line, whereas a light ray after the shift is indicated by a solid line.

In FIG. 10, the lower substrate 32 in the double refraction prism array 30 shown in FIG. 2 is omitted in illustration.

As for the shift quantity, it is desirable to present in the same position which is the center position of the original parallax image in both the case where the bottom surface of the prism 36 rises to the right and the case where the bottom surface falls to the right. Therefore, it is desirable that each shift quantity is equal to ¼ of the original distance between parallax images. Therefore, it is desirable that refractive index differences ne−n and n−no are equal to each other. This corresponds to the case where the refractive index n of the prism 36 assumes a value which is approximately the middle of "ne" and "no" as represented by the following expression (11).

$$n=(ne+no)/2 \quad (11)$$

Since there is a limit in kinds of actual transparent isotropic substance and material physical properties of transparent substances having the double refraction property, however, the expression (11) is not realistic. As a result of vigorous studies conducted by the present inventors, it has been appreciated that similar effects can be obtained as long as the range satisfies the following expression (12).

$$0.4 \times (ne+no) \leq n \leq 0.6 \times (ne+no) \quad (12)$$

If the expression (12) is satisfied, it is possible to substantially prevent the left and right shift quantity errors from causing moiré which becomes a cause of display degradation. Subsequently, an optimum range of the base angle $\theta_{prism}$ of the prism is determined. First, it is desirable to satisfy the following expressions (13) and (14). Since the relationship ne>n>no is satisfied, ne is the largest in refraction angle. Therefore, it is supposed that a range in which the light ray is refracted more, i.e., in which the light ray is refracted in the direction of the vertex of the prism is positive. As compared with Wmoto, Wshift(ne) becomes positive because the light ray is refracted in the direction of the vertex of the prism. As compared with Wmoto, Wshift(no) becomes negative because the light ray is refracted in a direction opposite to the direction of the vertex of the prism.

$$W\text{shift}(ne)=W\text{moto}/4 \quad (13)$$

$$W\text{shift}(no)=-W\text{moto}/4 \quad (14)$$

Representing these expressions by using the number N of parallaxes, the viewing angle $2\theta$ and the base angle $\theta_{prism}$ of the prism which are parameters representing the characteristics of the stereoscopic image display apparatus, the following expressions are obtained.

$$\tan\theta/(4N)=\tan\theta_{shift}(ne) \quad (15)$$

$$\tan\theta/(4N)=-\tan\theta_{shift}(no) \quad (16)$$

Adding together the expressions (16) and (17), the following expression is obtained.

$$\tan\theta/(2N)=\tan\theta_{shift}(ne)-\tan\theta_{shift}(no)$$

The expression can be modified as:

$$\tan\theta/(4N)/(\tan\theta_{shift}(ne)-\tan\theta_{shift}(no))=0.5 \quad (17)$$

When $\theta_{prism}$ satisfying the expression (17) is selected, presentation positions of parallax images have regular intervals as shown in FIG. 5. As a matter of fact, if the observation angle $\theta_k$ increases, then the shift quantities $\tan\theta_{shift}(ne)$ and $\tan\theta_{shift}(no)$ increase according to the Snell's law. Therefore, it is possible to set the left and right shift quantity errors so as to prevent moiré which becomes a cause of the display degradation from being caused while increasing the observation angle, by providing an upper limit value and a lower limit value as represented by the following expression.

$$0.4 \leq \tan\theta/(4N)/(\tan\theta_{shift}(ne)-\tan\theta_{shift}(no)) \leq 0.6 \quad (18)$$

Furthermore, in the same way as the expression (5), the following expressions are obtained.

$$\theta_{shift}(ne) = A\sin(\sin(A\sin(\sin(A\sin(\sin\theta_k/ne)+\theta_{prism})\times ne/n)-\theta_{prism})\times n)$$

$$\theta_{shift}(no) = A\sin(\sin(\theta_a-\theta_{prism})\times n)$$
$$= A\sin(\sin(A\sin(\sin(A\sin(\sin\theta_k/no)+\theta_{prism})\times no/n)-\theta_{prism})\times n)$$

Second Embodiment

A stereoscopic image display apparatus according to a second embodiment of the present invention will now be described.

If the variable polarization cell 10 is placed between the lens array 20 and the plane display device 2 as shown in FIGS. 1 and 2, then the gap g between the lens array 20 and pixels of the plane display device 2 cannot be made smaller than the thickness of the variable polarization cell 10. According to the expression (6), the gap g between the lens array 20 and pixels of the plane display device 2 is inversely proportional to the viewing angle 2θ, and proportional to the subpixel pitch sp and the number N of parallaxes. For making the gap g small, therefore, it is necessary to make the viewing angle 2θ wide, make the subpixel pitch small, or make the number N of parallaxes small. In these cases, however, it is difficult to configure the stereoscopic image display apparatus. Therefore, the stereoscopic image display apparatus according to the present has a configuration shown in FIGS. 11 and 12. In other words, the lens array 20, the double refraction prism array 30 and the variable polarization cell 10 are provided in the cited order between a transparent substrate 4b and a vertical polarizer 5b. As a result, the gap g can be made small.

In the present embodiment, the double refraction prism array 30 is provided right above the lens array 20. After passing through the lens array 20, pixel information of one elemental image is aligned in parallel to the optical axis direction with a square lens width of the lens array 20. Therefore, information of adjacent lenses in the lens array 20 are not apt to be mixed by making the distance between the lens array 20 and the double refraction prism array 30 short. The direction of polarization which passes through the prism 36 changes over at a rate which is twice the conventional frame rate, and the viewer can observe so as not to mix image information before changeover with that after the changeover.

The second embodiment differs from the first embodiment shown in FIG. 1 in that the double refraction prism array 30 is placed between fixed sheet polarizers 5a and 5b rotated by 90 degrees to exercise pixel gradation control. Therefore, both polarized light having the refractive index ne in the major axis direction and polarized light having the refractive index no in the minor axis direction pass through the double refraction prism array 30.

In the present embodiment, a liquid crystal display device, an organic EL, or a plasma display can be used as the plane display device 2. First, the case where a liquid crystal display device is used as the plane display device 2 will be described.

In the liquid crystal display device, a sheet polarizer is disposed on the top surface to control the gradation. When the liquid crystal display device is used in the present embodiment, the sheet polarizer is eliminated. If the liquid crystal display device is subjected to normally white drive, white display is conducted when a voltage is not applied to pixels. White display light in the case of the normally white is passed through the double refraction prism array 30 in the major axis direction to reveal the refractive index ne. If a voltage is applied to the variable polarization cell 10 located right above the double refraction prism array 30, then the incident polarization plane is maintained as it is, and consequently the white display light is passed through the linear polarizer on the top surface, and the viewer can see the white display light.

Figure 12:
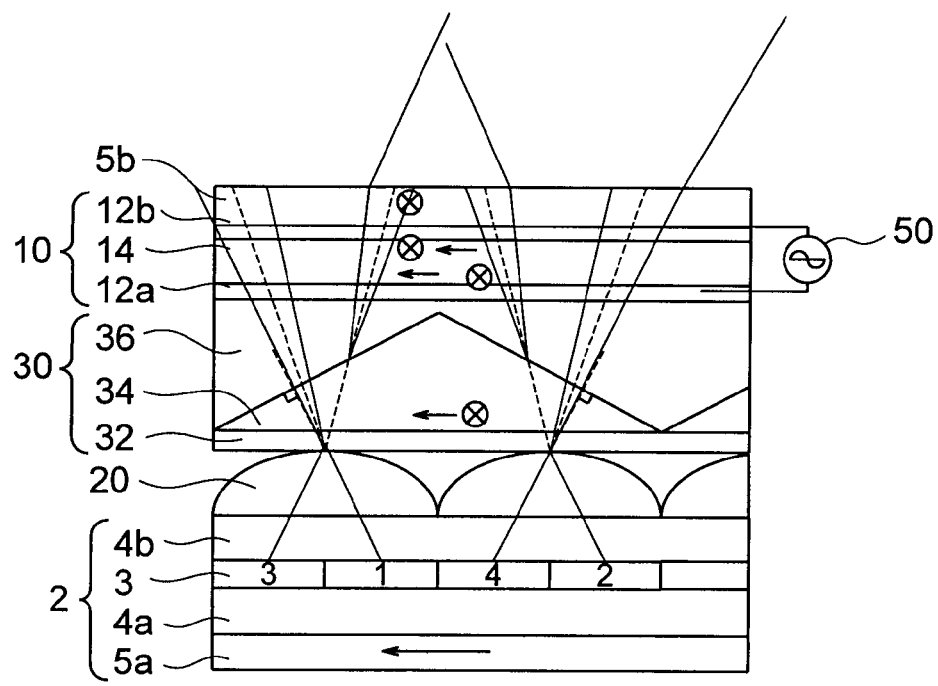
FIG. 12 is a horizontal sectional view showing another state of the stereoscopic image display apparatus according to the second embodiment.

If the liquid crystal display device is subjected to normally black drive in FIG. 12, white display is conducted when a voltage is applied to pixels. White display light in the case of the normally black is passed through the double refraction prism array 30 in the minor axis direction to reveal the refractive index no. If a voltage is applied to the variable polarization cell 10 located right above the double refraction prism array 30, then the incident polarization plane is rotated by 90 degrees, and consequently the white display light is passed through the linear polarizer on the top surface, and the viewer can see the white display light.

Figure 11:
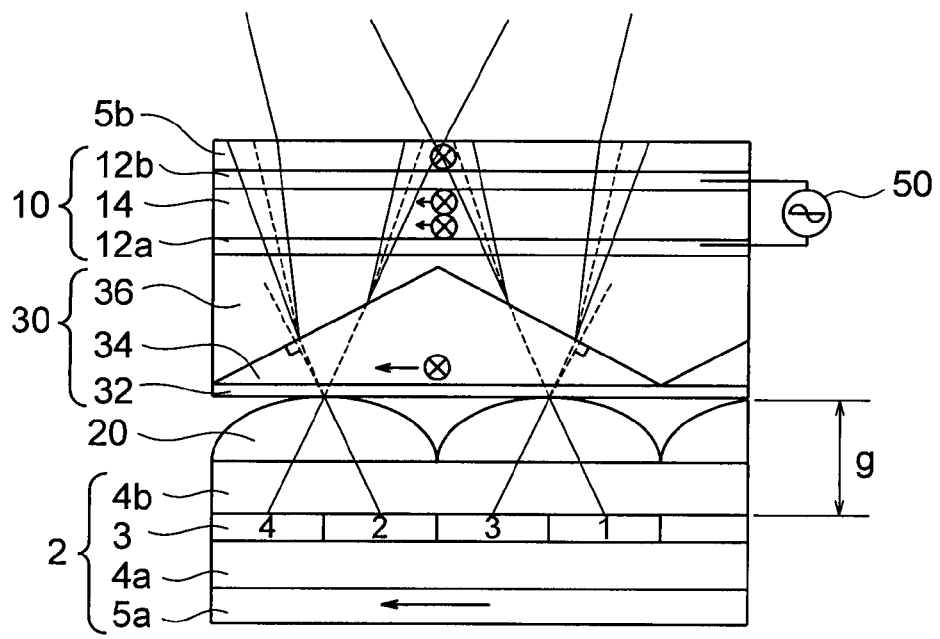
FIG. 11 is a horizontal sectional view showing one state of a stereoscopic image display apparatus according to a second embodiment of the present invention.

Time division drive is conducted so as to conduct the drive in the state shown in FIG. 11 in a former half of one frame and conduct the drive in the state shown in FIG. 12 in a latter half of the frame. As a result, the image presentation direction can be shifted, and as many parallax images as twice the number of conventional parallax images can be provided. A problem is caused in the drive shown in FIGS. 11 and 12 because the normally white and the normally black are changed over fast. If the luminance of white or black in the drive shown in FIG. 11 is not equal to that in the drive shown in FIG. 12, then the viewer senses a luminance difference such as flicker. That is the problem. It is necessary to conduct luminance correction sufficiently in gradations in both drives.

Figure 13:
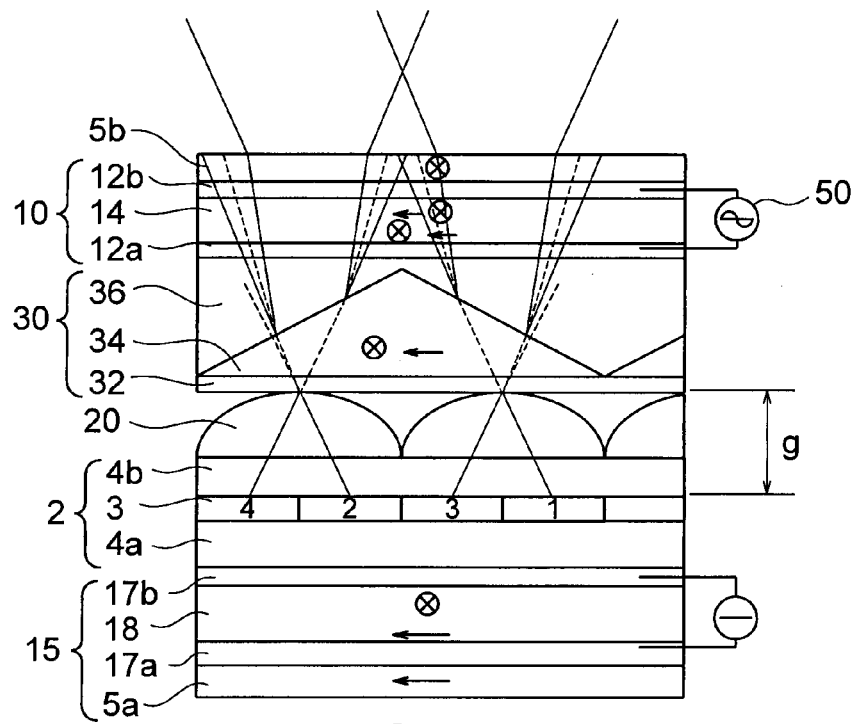
FIG. 13 is a horizontal sectional view of a stereoscopic image display apparatus according to a modification of the second embodiment.

For conducting both drives with the same normally white, another variable polarization cell 15 should be provided between the transparent substrate 4a in the plane display device and the vertical polarizer 5a. The variable polarization cell 15 includes transparent substrates 17a and 17b, and a variable polarization part 18 provided between the transparent substrates 17a and 17b. In the variable polarization part 18, the polarization direction is changed by applying an AC voltage between the transparent substrates. In other words, the stereoscopic image display apparatus according to the modification shown in FIG. 13 has a double variable polarization structure.

Third Embodiment

A stereoscopic image display apparatus according to a third embodiment of the present invention will now be described with reference to FIG. 14.

Figure 14:
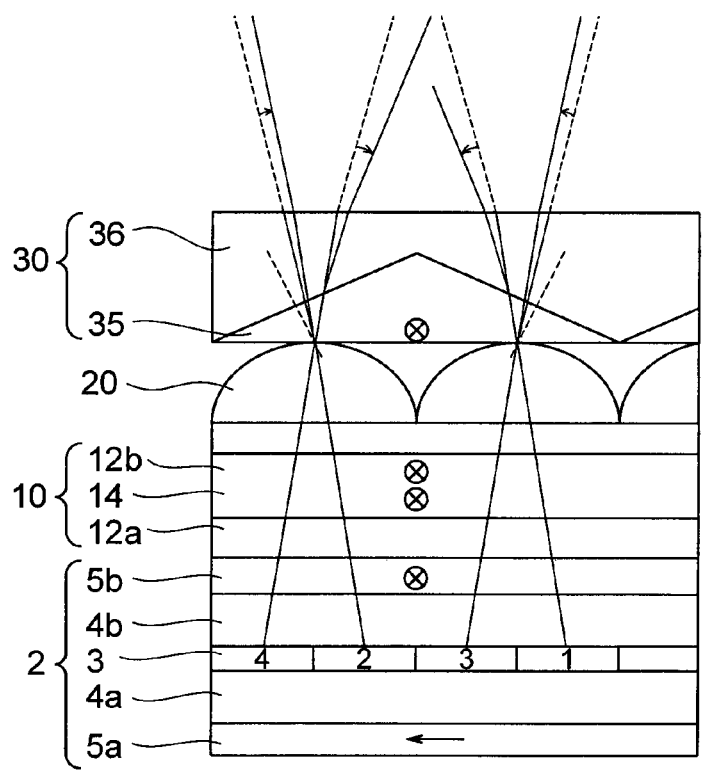
FIG. 14 is a horizontal sectional view of a stereoscopic image display apparatus according to a third embodiment.

FIG. 14 shows a horizontal section of a stereoscopic image display apparatus according to the present embodiment. The stereoscopic image display apparatus according to the present embodiment has a configuration which does not use liquid crystal but uses solidified UV setting liquid crystal monomer 35 as the double refraction substance 34 in the double refraction prism array 30 in the stereoscopic image display apparatus according to the first embodiment shown in FIG. 1. As a result, it becomes possible to eliminate the lower substrate 32 in the double refraction prism array 30, and the double refraction prism array 30 can be made to further approach the lens array 20.

Fourth Embodiment

A stereoscopic image display apparatus according to a fourth embodiment of the present invention will now be described with reference to FIG. 15.

The stereoscopic image display apparatus according to the present embodiment has a configuration obtained from the stereoscopic image display apparatus according to the first embodiment shown in FIG. 1 by making a pitch lprism_p of the prism 36 slightly shorter than twice a pitch lp of the lens array 20.

In FIG. 1, there are two lenses right under the prism having one vertical angle. If a light ray emitted from the plane display device 2 is passed through a leftmost lens shown in FIG. 1, then it is desirable that the light ray is passed through a boundary of a left-side prism which rises to the right in the double refraction prism 30. If the observation angle ($\theta_k$) becomes large, however, then a phenomenon that the light ray emitted from the plane display device 2 and passed through the leftmost lens is passed through a boundary of a right-side prism which falls to the right in the double refraction prism 30 occurs. As a result, the light ray is refracted in a direction different from an angle at which the original parallax image should project. Therefore, crosstalk occurs and consequently a parallax image different from a parallax image which should be originally visible is visible. For preventing such crosstalk, it is desirable to direct a line coupling center of a lens and a center of the double refraction prism to a viewer located in the center, so as to cause the viewer located in the center to view the stereoscopic image normally even at the leftmost and the rightmost lens of the stereoscopic image display apparatus. Therefore, the pitch lprism_p of the prism 36 should be made slightly shorter than twice the pitch lp of the lens array 20 as shown in FIG. 15.

Figure 15:
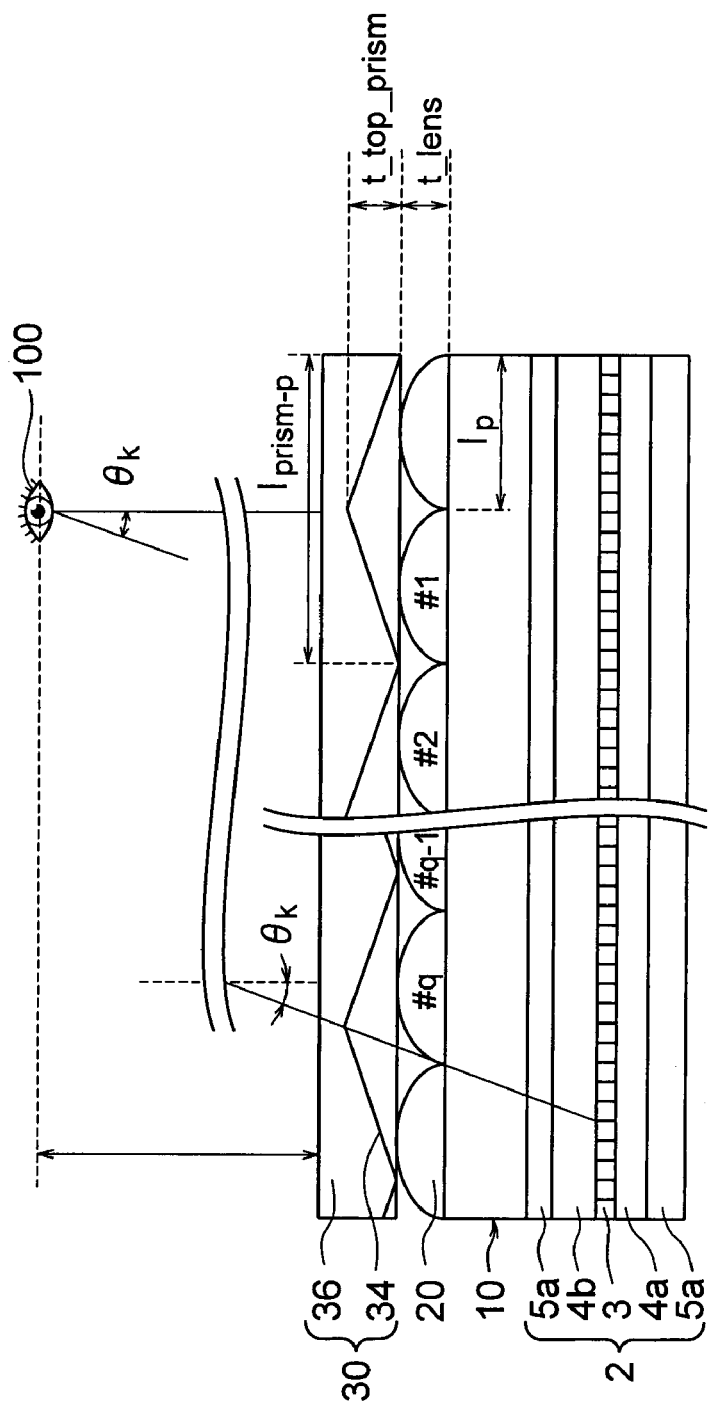
FIG. 15 is a horizontal sectional view of a stereoscopic image display apparatus according to a fourth embodiment.

Relationships between lprism_p and lp will be found by using FIG. 15.

Supposing that the number of lenses ranging from the lens center to the second lens from the lens end is q, the number of sides of the prism also becomes q.

Denoting the viewing distance between the vertex of the lens array and the viewer by L, the thickness of the lens between its upper surface and its lower surface in the lens array 20 by t_lens, and the distance between a lower surface of the double refraction prism array 30 and its vertical angle upper surface by t_top_prism, the following expression is obtained on the basis of relationships of similarity of a triangle.

$(L+t\_lens):(L-t\_top\_prism)=(lp \times q):(lprism\_p \times q/2)$ $(L+t\_lens):(L-t\_top\_prism)=(lp \times 2):(lprism\_p)$ $(lprism\_p) \times (L+t\_lens)=(L-t\_top\_prism) \times (lp \times 2)$ $lprism\_p=(L-t\_top\_prism) \times lp \times 2/(L+t\_lens)$ (19)

So as to satisfy the expression, lprism_p is made slightly shorter.

Fifth Embodiment

A stereoscopic image display apparatus according to a fifth embodiment of the present invention will now be described with reference to FIG. 16.

Figure 16:
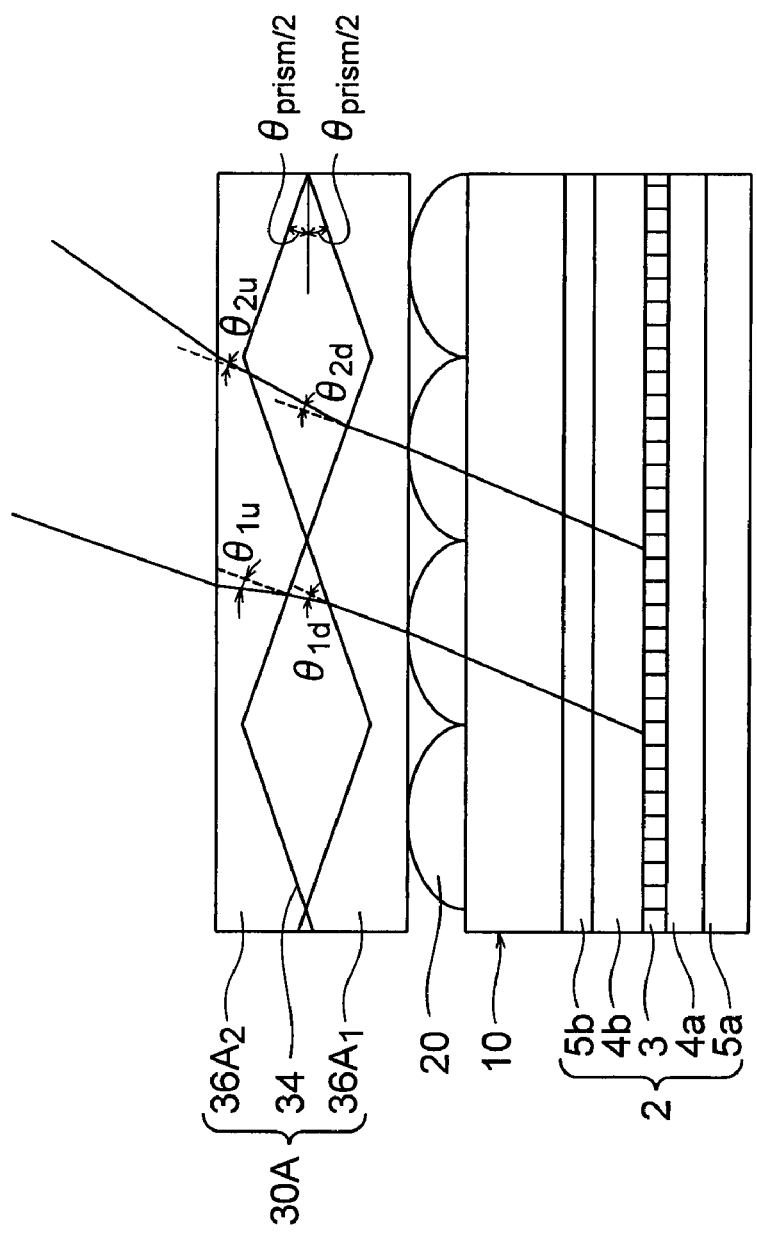
FIG. 16 is a horizontal sectional view of a stereoscopic image display apparatus according to a fifth embodiment.

FIG. 16 shows a horizontal section of a stereoscopic image display apparatus according to the present embodiment. The stereoscopic image display apparatus according to the present embodiment has a configuration obtained from the stereoscopic image display apparatus according to the first embodiment shown in FIG. 1 by replacing the double refraction prism array 30 by a double refraction prism array 30A. The double refraction prism array 30A includes a lower prism 36$A_1$ having a flat lower surface and an upper surface provided with a plurality of first grooves each taking a shape of a triangular prism, an upper prism 36$A_2$ having a flat upper surface and a lower surface provided with a plurality of second grooves each taking a shape of a triangular prism with the same pitch as that of the first grooves so as to be opposed to the first grooves, and a double refraction substance 34 provided between the opposed first grooves and second grooves. In the present embodiment, each of the lower prism and the upper prism has a base angle which is equal to half of the base angle $\theta_{prism}$ of the prism 36 of the first embodiment.

The viewing angle can be increased by using the configuration according to the present embodiment. If a prism on one side which rises to the right is used, then the viewing angle $\theta_k$ is in the range of −32 to 22 degrees to satisfy the expression (9) as shown in FIG. 8, resulting in lateral nonsymmetry. The reason why the nonsymmetry is caused is that the shift quantity becomes large as the incidence angle becomes shallow at an interface between substances which differ in refractive index. For causing the shift quantity in the light ray direction to satisfy the expression (9) when incident on the interface which falls to the right, the viewing angle $\theta_k$ is in the range of −22 to 32 degrees. In the present embodiment, a prism having a prism surface which rises to the right and a prism having a prism surface which falls to the right are combined to form a double-faced prism. As a result, incidence having a shallow incidence direction and incidence, which is near to the vertical direction, are combined, resulting in mutual cancellation. An effect that the shift quantity is flattened is obtained.

This will be described hereafter. If a light ray passes through an interface which rises to the right like the left-side light ray in FIG. 16, then the light ray is in a direction that the refractive index increases at the interface and consequently shifts to the left side by an angle $\theta_{1d}$. If this light ray passes through the double refraction substance 34 and passes through an interface which falls to the right, then the light ray is in a direction that the refractive index decreases at the interface and consequently shifts to the left side in this case as well by an angle $\theta_{1u}$. Since the first incidence angle is incident on the interface obliquely, the shift quantity becomes large. At the second interface which falls to the right, however, the incidence is substantially the vertical incidence and consequently the shift quantity is restricted. If a light ray passes through an interface which falls to the right like the right-side light ray, then the light ray is in a direction that the refractive index increases at the interface and consequently shifts to the right side by an angle $\theta_{2d}$. If this light ray passes through the double refraction substance 34 and passes through an interface which rises to the right, then the light ray is in a direction that the refractive index decreases at the interface and consequently shifts to the right side in this case as well by an angle $\theta_{2u}$. In this case, the shift quantity becomes large. In this way, a double-faced prism is formed. As a result, incidence having a shallow incidence direction and incidence, which is near to the vertical direction, are combined, resulting in mutual cancellation. An effect that the shift quantity is flattened is obtained.

In such a double-faced prism, the major axis direction of the double refraction substance 34 should be aligned with the ridge directions of the prisms $36A_1$ and $36A_2$. A refractive index $n_{up}$ of the upper prism $36A_2$ and a refractive index $n_{down}$ of the lower prism $36A_1$ should be set to substantially a middle between a refractive index ne in the major axis direction of the double refraction substance 34 and a refractive index no in the minor axis direction. In other words, the following expression should be satisfied.

$$n_{up} = n_{down} = (ne+no)/2$$

$$n_{up} = n_{down} = 0.5 \times (ne+no) \quad (20)$$

However, it is not realistic to cause the refractive indexes $n_{up}$ and $n_{down}$ of the actual transparent isotropic substance and the material physical property values ne and no of the transparent substances having the double refraction property to satisfy the expression (20), because there is a limit in kinds of substances. As a result of vigorous studies conducted by the present inventors, it has been appreciated that similar effects can be obtained as long as the range satisfies the following expression (21).

$$0.4 \times (ne+no) \leq n \leq 0.6 \times (ne+no) \quad (21)$$

The expression (22) should be satisfied,

If the double refraction prism array 30 is provided with the double-faced prism structure as in the present embodiment, then it becomes possible to reduce the base angle $\theta_{prism}$ of each prism to approximately half, and it is possible to make the thickness of each of the lower and upper prisms $36A_1$ and $36A_2$ small. If liquid crystal is used as the double refraction substance, orientation is facilitated.

Figure 17:
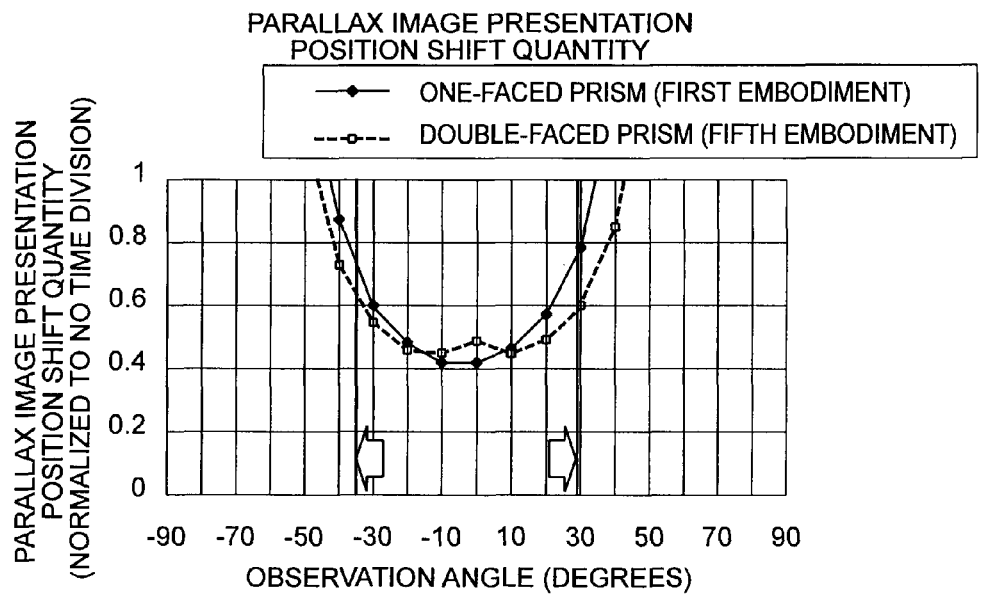
FIG. 17 is a diagram showing a presentation position of a parallax image found by calculation in the fifth embodiment.

Presentation positions of the parallax image found by calculation in the present embodiment are shown in FIG. 17. If the expression (9) is satisfied to cause the shift quantity to become 0.4 to 0.6 of the distance between adjacent parallax images in the case where the double refraction prism array is not placed, then the viewing angle falls in the range of −35 degrees to 30 degrees. The viewing angle can be increased remarkably as compared with the one-faced double refraction prism array.

Sixth Embodiment

Figure 18:
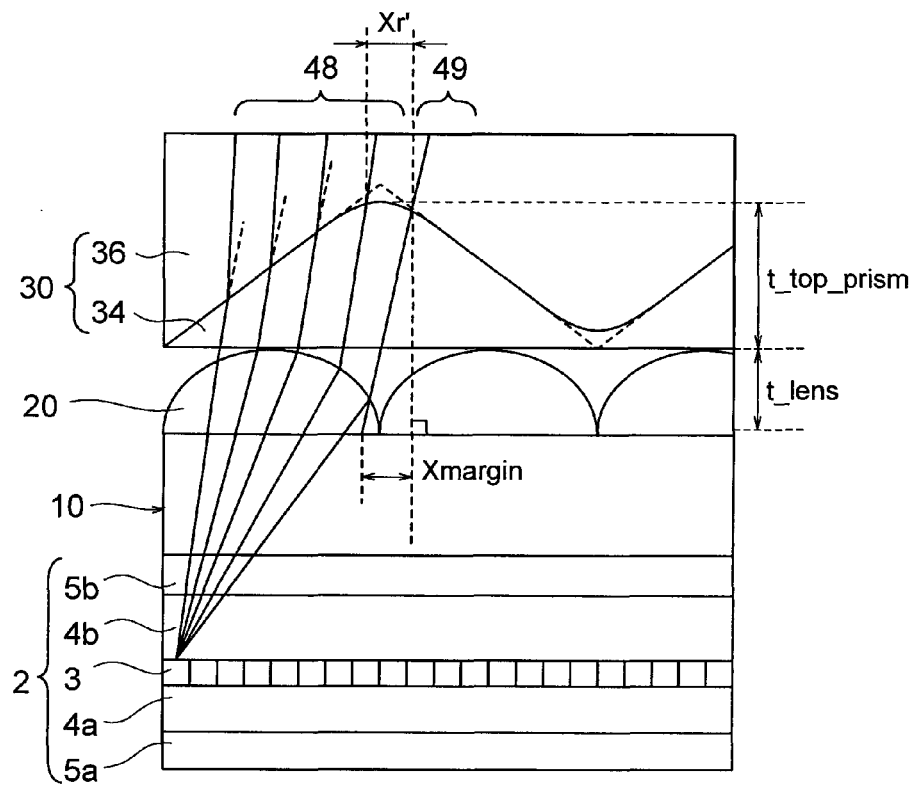
FIG. 18 is a horizontal sectional view of a stereoscopic image display apparatus according to a sixth embodiment.

A stereoscopic image display apparatus according to a sixth embodiment of the present invention is shown in FIG. 18. The stereoscopic image display apparatus according to the present embodiment has a configuration obtained from the stereoscopic image display apparatus according to the first embodiment shown in FIG. 1 by providing mountain parts and valley parts of the prism 36 in the double refraction prism array 30 with smooth spherical shapes.

Figure 19:
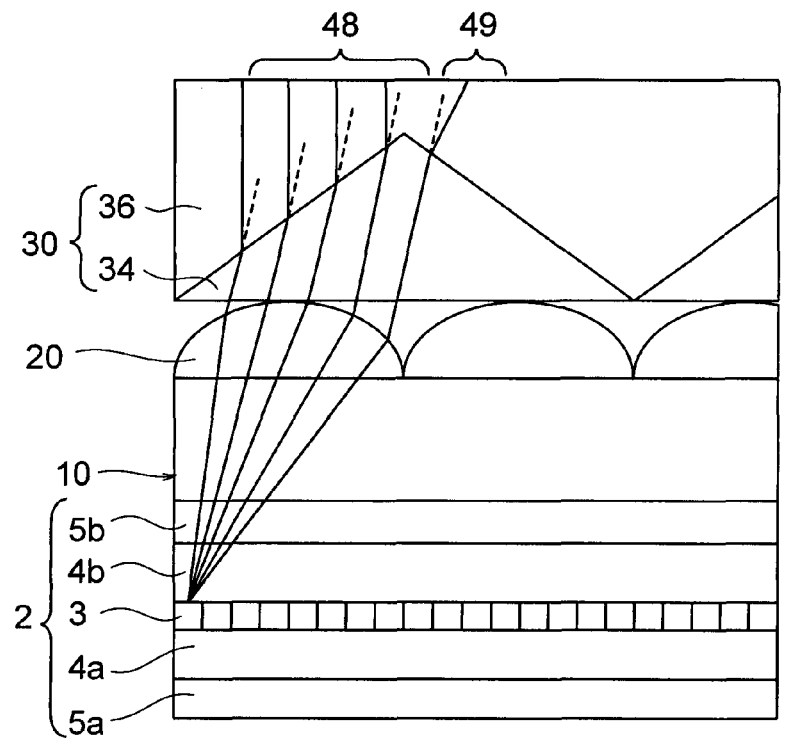
FIG. 19 is a horizontal sectional view of a stereoscopic image display apparatus according to a comparative example of the sixth embodiment.

If the mountain part and the valley part of the prism 36 are sharp as shown in FIG. 19, then light rays 48 incident on the left side of the mountain part among light rays incident near the mountain part obliquely are shifted to the left side, whereas a light ray 49 incident on the right side of the mountain part is shifted to the right side. In other words, the light rays incident near the mountain part obliquely are shifted in opposite directions with the mountain part serving as a borderline. Therefore, aliasing of the parallax image is caused according to the viewing position, and degradation due to such crosstalk becomes remarkable. If the mountain part and the valley part of the prism 36 is provided with spherical shapes as in the present embodiment, then light rays passing adjacent lens ends project in the same direction, and consequently the aliasing of the parallax image can be prevented.

In this case, the range of the spherical shape (spherical radius) poses a problem. In the spherical shape part, the angle of a boundary part between the shoulder of the prism and the double refraction part differs from $\theta_{prism}$. If the spherical radius is made large and a smooth part of the vertical angle of the prism is made long, therefore, a region where the light ray is refracted in the correct direction by the double refraction prism after passing through the lens becomes narrow. If the spherical radius is too short, however, then an aliasing part of the parallax image passed through adjacent double refraction prisms after being passed through the lens and refracted in incorrect directions occurs. From the foregoing description, it is possible to prevent aliasing of the parallax image and extend a correct light ray region by setting the spherical radius into an optimum range. As regards the aliasing region of the parallax image, the total value of the distance t_top_prism in thickness direction between the vertical angle of the double refraction prism array 36 and the vertex of the lens array 20 and a thickness t_lens of the lens array is concerned deeply. If this distance is short, a correct light ray range in which a light ray passed through the lens from a pixel is passed through the double refraction prism through which the light ray should originally pass becomes wide.

For example, if the shape of the double refraction prism is represented by using a radius of curvature r and an elliptic coefficient k, coordinates (x, z) shown in FIG. 18 are represented by the following expression.

$$z = \frac{\frac{1}{r}x^2}{1 + \sqrt{1 - \frac{(1+k)x^2}{r^2}}}$$

At this time, a total length $x_r$ of a part in which the vertical angle of the double refraction prism becomes a curved surface, in the pitch direction of the prism, i.e., in the left-right direction of the vertical angle part is found.

For example, when $\theta_{prism}$=16 to 26 degrees, the elliptic coefficient becomes k=−4 to −12. When the radius R of curvature of the vertical angle of the prism is changed from 0.05 nm to 0.2 mm, the part $x_r$ in which the vertical angle becomes a curved surface is calculated and shown in TABLE 1.

TABLE 1

| Radius of curvature of vertical angle of lens and length over which vertical length assumes lens shaped curve surface in typical example | | | | |
| --- | --- | --- | --- | --- |
| r (mm) | 0.05 | 0.1 | 0.15 | 0.2 |
| k | −8 | −8 | −8 | −8 |
| $x_r$ (mm) | 0.02 | 0.04 | 0.06 | 0.08 |

From the TABLE 1, the following approximate expression is derived.

$$x_r = r \times 0.4 \quad (22)$$

In the range of the viewing angle of an autostereoscopic image display apparatus using the integral imaging scheme, a part $x_r$ in which a vertical angle of the lens becomes a curved surface required for a light ray from the display surface to pass the lens and be incident on a prism through which the light ray should originally pass will now be found.

As a value which can be manufactured, it is supposed that t_top_prism (0.1 mm)+t_lens(0.05 mm)=0.15 mm. In the range of the viewing angle ±θ of the autostereoscopic image display apparatus, a margin quantity x_margin required to prevent a light ray passed through a certain lens end from passing through another prism adjacent to a boundary of a prism through which the light ray should originally pass will now be found. Supposing the refractive index of the upper substrate (prism) 36 to be n, an angle range y of the light ray incident on the vertical angle part of the prism at the viewing angle θ, which is a viewing angle, becomes as follows:

$$\sin(\theta) = n \times \sin(y)$$

$$y = \arcsin(\sin(\theta)/n) \quad (23)$$

Multiplying by 2 with due regard to the left and right contact width and finding $x_r$, the following expression is obtained:

$$X\text{margin} = (t\_\text{top\_prism} + t\_\text{lens}) \times \tan(y) \times 2$$

Substituting (23) into the expression, the following expression is obtained.

$$X\text{margin} = (t\_\text{top\_prism} + t\_\text{lens}) \times \tan(\arcsin(\sin(\theta)/n)) \times 2$$

$$X\text{margin} = xr$$

should be satisfied. Aliasing of the parallax image can be prevented by satisfying the following conditions:

$$(t\_\text{top\_prism} + t\_\text{lens}) \times \tan(\arcsin(\sin(\theta)/n)) \times 2 = r \times 0.4$$

$$r = 5 \times (t\_\text{top\_prism} + t\_\text{lens}) \times \tan(\arcsin(\sin(\theta)/n))$$

Seventh Embodiment

Figure 20:
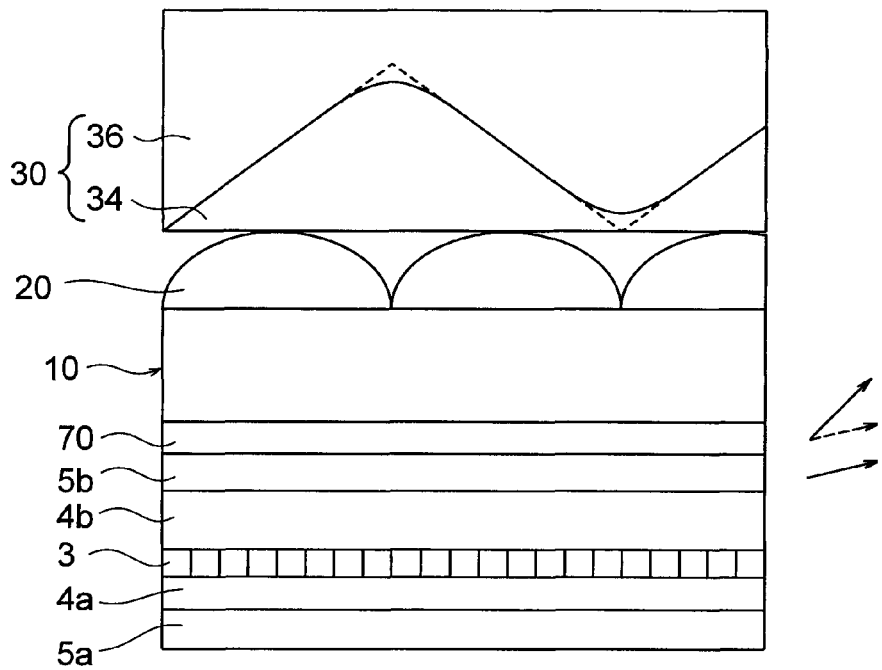
FIG. 20 is a horizontal sectional view of a stereoscopic image display apparatus according to a seventh embodiment.

A stereoscopic image display apparatus according to a seventh embodiment of the present invention is shown in FIG. 20. FIG. 20 is a horizontal section view of the stereoscopic image display apparatus according to the present embodiment. The stereoscopic image display apparatus according to the present embodiment has a configuration obtained from the stereoscopic image display apparatus according to the first, third, fourth, fifth or sixth embodiment by providing a retardation film (half-wave plate) 70 between the sheet polarizer (vertical polarizer) 5b of the plane display device and the variable polarization cell 10. If the polarization plane of the sheet polarizer 5b in the plane display device 2 does not coincide with the ridge of the lens array 20, the polarization plane of the light ray is rotated by using the retardation film 70 to make the polarization plane coincide with the ridge of the lens array 20.

Eighth Embodiment

Figure 23:
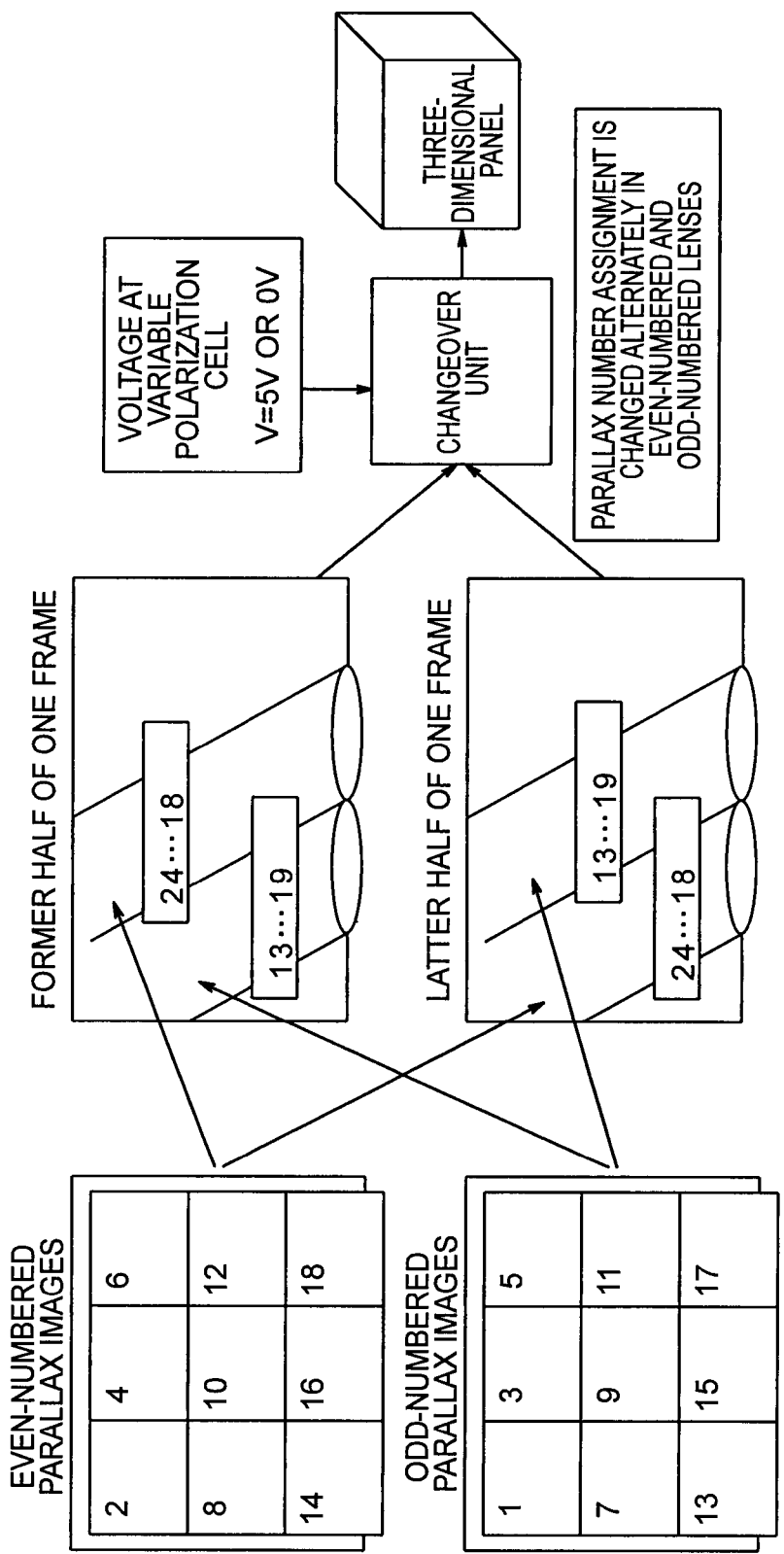
FIG. 23 is a diagram for explaining an example of display of a stereoscopic image display apparatus of an eighth embodiment.
Figure 24:
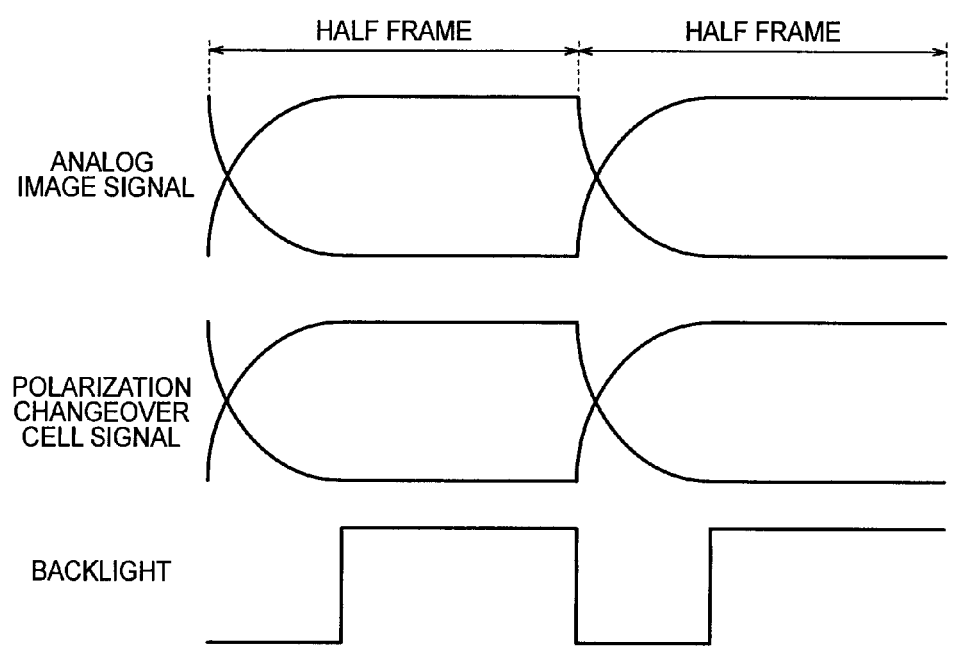
FIG. 24 is a diagram showing a timing chart in the stereoscopic image display apparatus in the first embodiment.

A stereoscopic image display apparatus according to an eighth embodiment of the present invention will now be described with reference to FIG. 23.

The stereoscopic image display apparatus according to the present embodiment is a stereoscopic image display apparatus according to any of the first to seventh embodiments. FIG. 23 is a diagram for explaining an example of display in the stereoscopic image display apparatus according to the present embodiment. First, tiling images of even-numbered parallax images and odd-numbered parallax images are generated beforehand as shown in FIG. 23, and images of a former half part and a latter half part of one frame are assigned alternately every lens by mapping. Concurrently with changeover of the voltage of the variable polarization cell 10 conducted by a changeover unit, the image displayed on the three-dimensional panel is also changed over. As a result, stereoscopic images are displayed with time division.

When image information in the former half of one frame is mixed with image information in the latter half at the time of image changeover, crosstalk is caused. If a liquid crystal display device having a backlight is used as the plane display device 2, therefore, a stereoscopic image with little crosstalk can be displayed by conducting intermittent drive so as to turn off the backlight at the time of image changeover. If the liquid crystal display device has an area power supply, intermittent drive may be conducted every area.

Ninth Embodiment

A stereoscopic image display apparatus according to a ninth embodiment of the present invention will now be described with reference to FIG. 30.

The stereoscopic image display apparatus according to the present embodiment has a configuration obtained from the stereoscopic image display apparatus according to the first embodiment shown in FIG. 1 by making the pitch lprism_p of the prism 36 slightly shorter than twice the pitch lp of the lens array 20.

In FIG. 1, there are two lenses right under the prism having one vertical angle. If a light ray emitted from the plane display device 2 is passed through a leftmost lens shown in FIG. 1, then it is desirable that the light ray is passed through a boundary of a left-side prism which rises to the right in the double refraction prism 30. If the viewing angle ($\theta_k$) becomes large, however, then a phenomenon that the light ray emitted from the plane display device 2 and passed through the leftmost lens is passed through a boundary of a right-side prism which falls to the right in the double refraction prism 30 occurs. As a result, the light ray is refracted in a direction different from an angle at which the original parallax image should project. Therefore, crosstalk occurs and consequently a parallax image different from a parallax image which should be originally visible is visible. For preventing such crosstalk, it is desirable to direct a line coupling center of a lens and a center of the double refraction prism to a viewer located in the center, so as to cause the viewer located in the center to view the stereoscopic image normally even at the leftmost and the rightmost lens of the stereoscopic image display apparatus. Therefore, the pitch lprism_p of the prism 36 should be made slightly shorter than twice the pitch lp of the lens array 20 as shown in FIG. 30.

Figure 30:
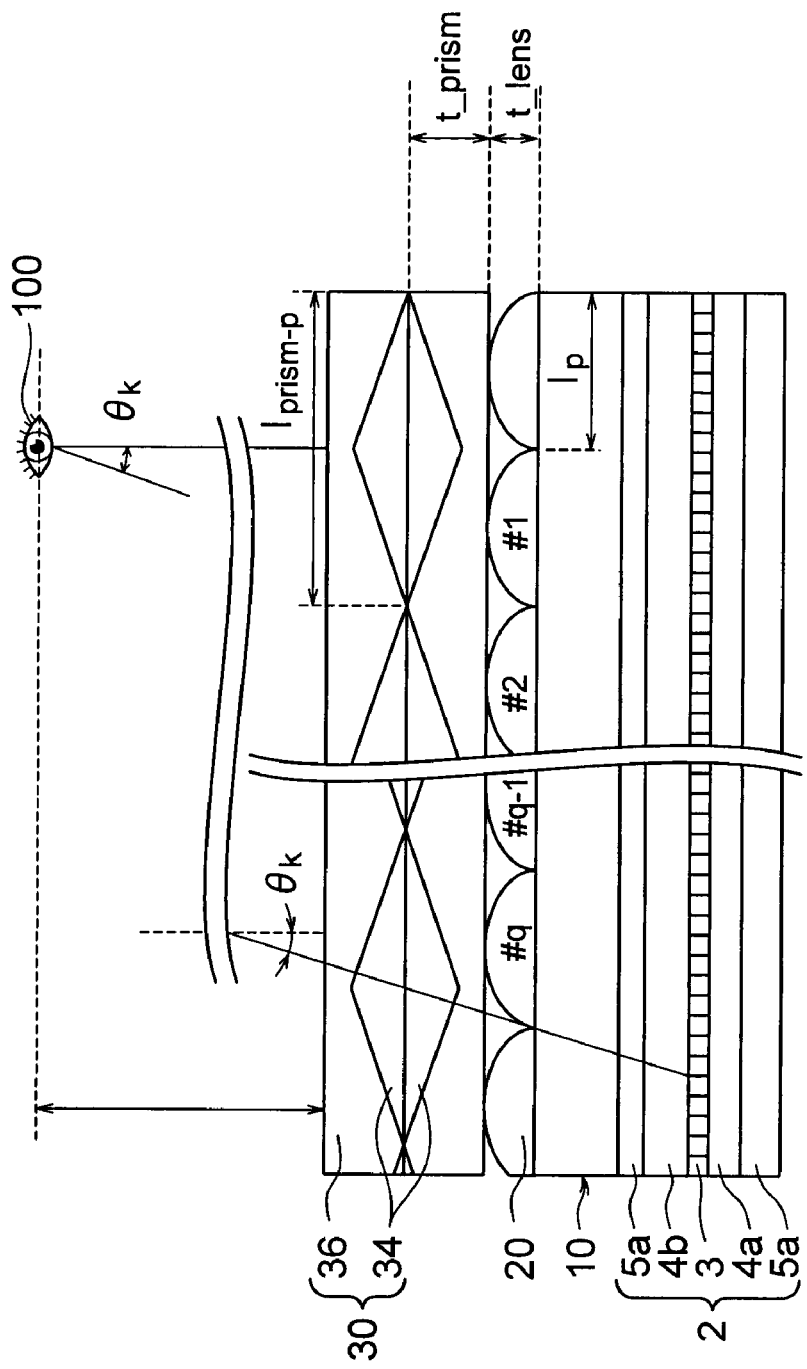
FIG. 30 is a horizontal sectional view of a stereoscopic image display apparatus according to a ninth embodiment.

Relationships between lprism_p and lp will be found by using FIG. 30.

Supposing that the number of lenses ranging from the lens center to the second lens from the lens end is q, the number of sides of the prism also becomes q.

Denoting the viewing distance between the vertex of the lens array and the viewer by L, the thickness of the lens between its upper surface and its lower surface in the lens array 20 by t_lens, and a distance to the upper surface of the prism 30 by t_prism, the following expressions are obtained on the basis of relationships of similarity of a triangle.

$$(L + t\_\text{lens}) : (L - t\_\text{prism}) = (lp \times q) : (l\text{prism}\_p \times q/2)$$

$$(L + t\_\text{lens}) : (L - t\_\text{prism}) = (lp \times 2) : (l\text{prism}\_p)$$

$$l\text{prism}\_p = (L - t\_\text{prism}) \times lp \times 2 / (L + t\_\text{lens})$$

So as to satisfy the expression, lprism_p is made slightly shorter.

Two examples of the variable polarization cell 10 used in the stereoscopic image display apparatus according to the first to ninth embodiments will now be described. In the first example, OCB liquid crystal is used as the variable polarizer 14 in the variable polarization cell 10. The OCB liquid crystal is known because of its fast drive.

Figure 25:
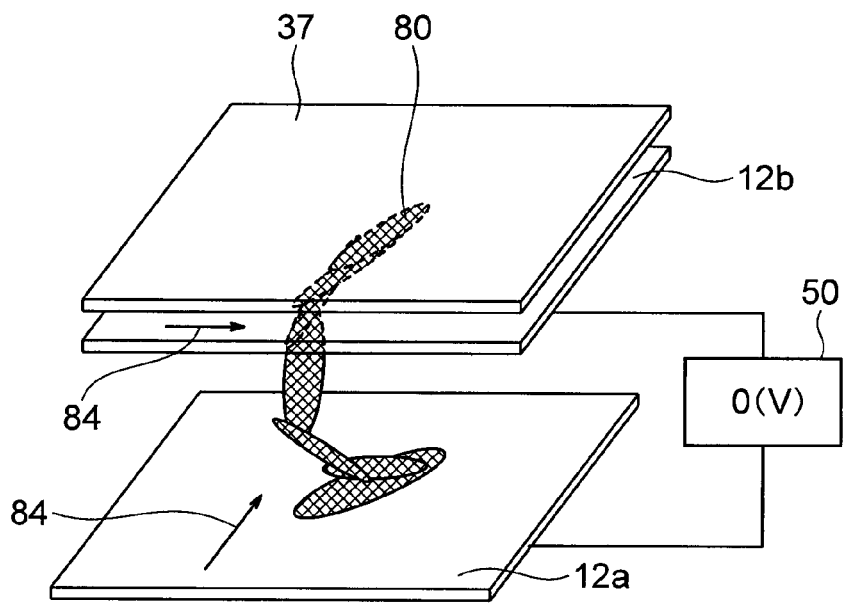
FIG. 25 is a diagram for explaining one state obtained when OCB liquid crystal is used in a variable polarization cell.

It is now supposed that a light ray having a polarization plane in a direction obtained by inclining a rubbing direction 84a of the lower substrate 12a is incident as shown in FIG. 25. At this time, a voltage is not applied between the lower substrate 12a and the upper substrate 12b by a power supply 50. Denoting retardation of OCB liquid crystal 80 by Re, the difference in refractive index between the major axis and the minor axis by Δn, and thickness by d, the polarization plane rotates by 90 degrees when the following relationship is satisfied $$Re = \Delta n \times d$$

i.e., a half wavelength is set.

Figure 26:
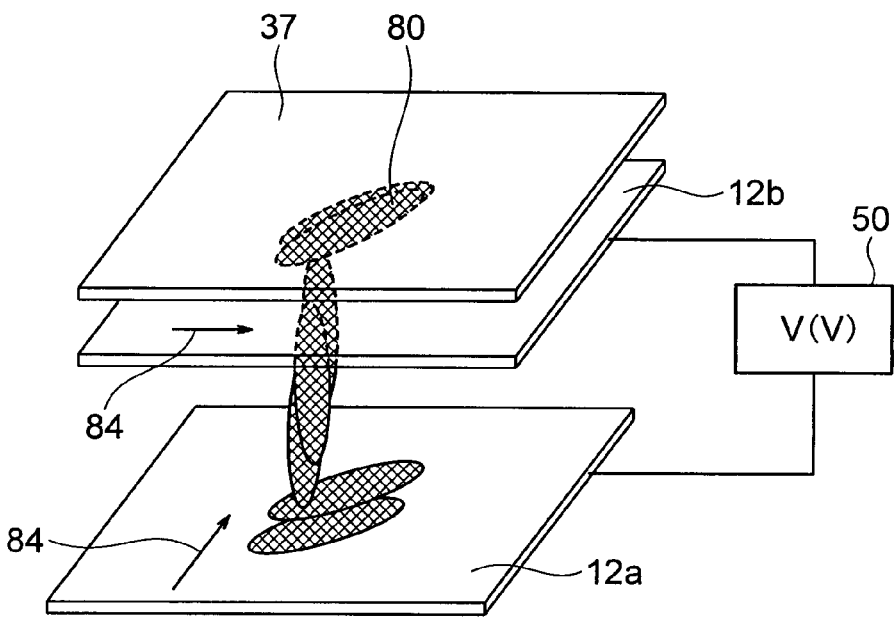
FIG. 26 is a diagram for explaining another state obtained when OCB liquid crystal is used in a variable polarization cell.

If a voltage is applied between the lower substrate 12a and the upper substrate 12b by the power supply 50 as shown in FIG. 26, then the liquid crystal 80 stands erect in the vertical direction and consequently the light ray is passed through as it is without bending the polarization plane.

If the polarization plane is rotated by utilizing the retardation as described above, fine adjustment using the retardation film is necessary in many cases. In FIG. 26, a voltage is applied between electrodes having liquid crystal therebetween to make the liquid crystal rise. However, a countermeasure such as insertion of the retardation film is taken to correct a transition state of rise of liquid crystal near the electrode substrates.

In a second example, TN liquid crystal is used as the variable polarizer 14 in the variable polarization cell 10.

Figure 27:
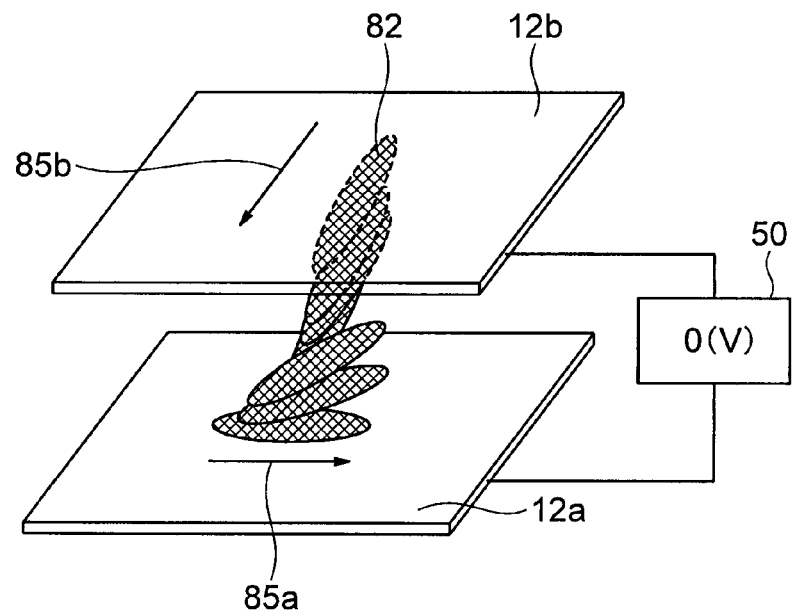
FIG. 27 is a diagram for explaining one state obtained when TN liquid crystal is used in a variable polarization cell.
Figure 28:
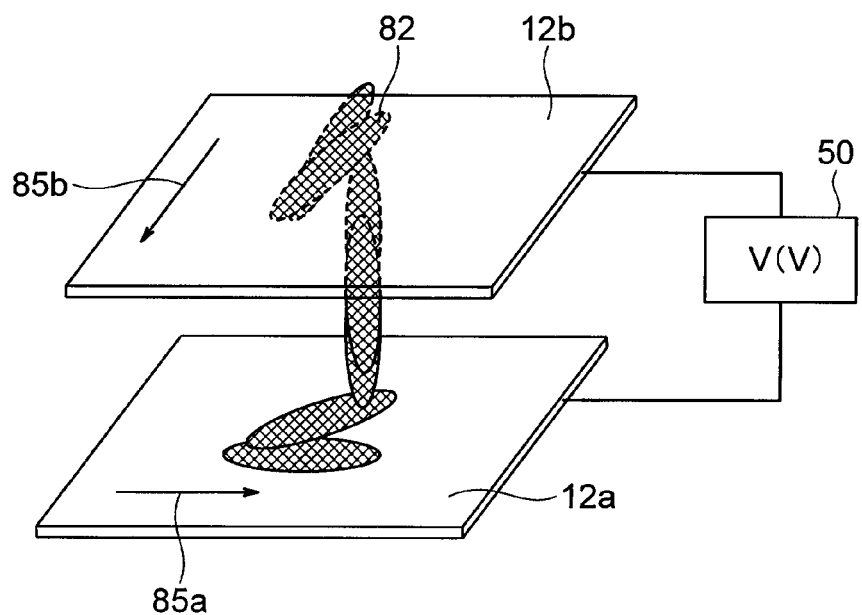
FIG. 28 is a diagram for explaining another state obtained when TN liquid crystal is used in a variable polarization cell.

In the TN liquid crystal as well, liquid crystal, which is high in isotropy and fast, is used. As shown in FIG. 27, a rubbing direction 85a of the TN liquid crystal 82 on the lower substrate 12a and a rubbing direction 85b on the upper substrate 12b are made perpendicular to each other. As a result, light incident in the same direction as the rubbing direction 85a on the lower substrate 12a rotates by 90 degrees together with a distortion. FIG. 27 shows a state in which a voltage is not applied between the lower substrate 12a and the upper substrate 12b by the power supply 50. If a voltage is applied between the lower substrate 12a and the upper substrate 12b by the power supply 50 as shown in FIG. 28, then liquid crystal 82 stands erect in the vertical direction and consequently the light ray is passed through as it is without bending the polarization plane.

Figure 29:
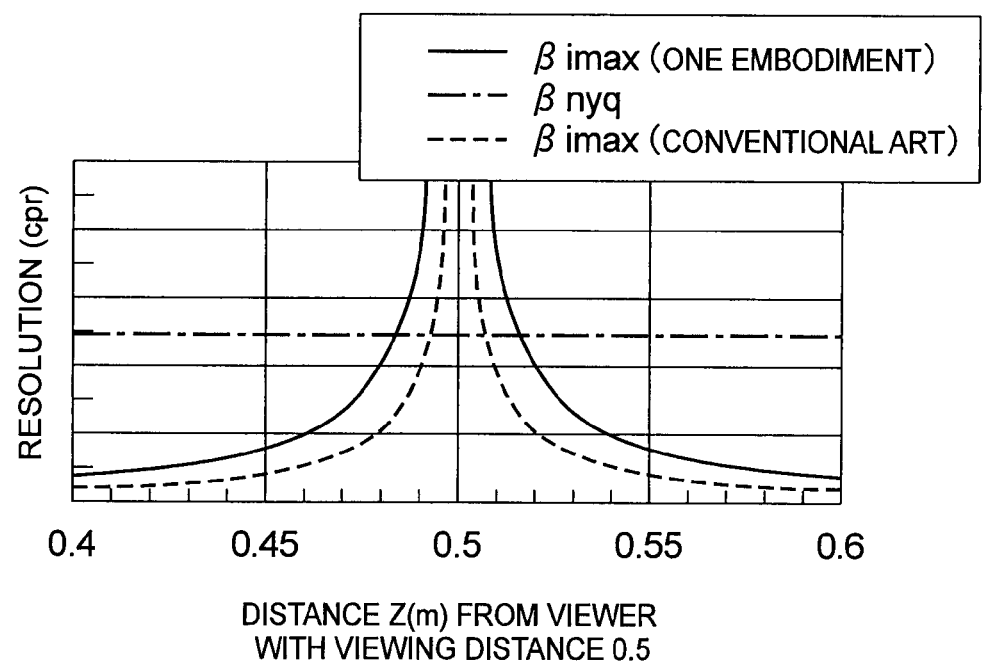
FIG. 29 is a diagram showing relationships between a distance from the viewer and resolution.

According to the embodiments of the present invention, a new parallax image can be displayed in a middle position between conventional parallax images by conducting time division drive as heretofore described, and light ray density can be increased. FIG. 29 shows a resolution of the stereoscopic image display apparatus which is shown in H. Hoshino, F. Okano, H. Isono and I. Yuyama, "Analysis of resolution limitation of integral photography," J. Opt. Soc. Am, A15 (1998) pp. 2059-2065. The abscissa axis represents a distance from the viewer. Since the viewing distance is set to 0.5 m, the stereoscopic image display apparatus is disposed at a distance of 0.5 m. A position having a small numerical value is a far-side position, whereas a position having a large numerical value is a nearside position. The ordinate axis represents resolution, and its unit is cpr (cycles per radian). In FIG. 29, βimax denotes a light ray density projected from one lens. The light ray density becomes higher as the position becomes closer to the display surface of the plane display device 2. In FIG. 29, βnyq denotes resolution of a light ray projected from one lens in the direction of the viewer. If the viewing distance is fixed, then the resolution βnyq is constant regardless of the stereoscopic image display position. The resolution of the stereoscopic display of the integral imaging scheme becomes βimax or βnyq, whichever is the lower. In FIG. 29, a range between intersections of βimax and βnyq is a stereoscopic representation range. It is appreciated that a stereoscopic representation range, which is twice that of the conventional art, is made possible by conducting the time division display in the embodiments of the present invention.

If the shift quantity increases and consequently Wshift/Wmoto becomes at least 1.0 in the embodiments of the present invention, then a correct parallax image cannot be exhibited, and luminance unevenness is caused, for example, when the focal distance meets the black matrix. In the elemental image corresponding to each of lenses in the lens array, however, luminance unevenness can be eliminated by taking a countermeasure such as changing the position of the black matrix or increasing the spot width by means of lens focus.

There is also a method of making the ridge direction of the lens array different from the plane display device. This is one method used to cope with moiré. If a countermeasure against moiré is taken by using a different method, however, the ridge direction of the lens array may be the same as the pixel direction.

As appreciated from FIG. 8, Wshift/Wmoto is in the range of 0.75 or more and 1.0 or less when the viewing angle is in the range of −42 to −38 degrees or in the range of 31 to 35 degree. In this case, correct parallax images may be presented by assigning adjacent parallax images with one parallax image between, instead of assigning adjacent parallax images as shown in FIGS. 21 and 22. For example, it is supposed that the lens is the leftmost one on the paper as shown in FIG. 15. In the case of a prism which falls to the right, the shift quantity poses no problem because the angle of incidence to the prism is deep. In the case of a prism which rises to the right, however, the shift quantity becomes large. In that case, correct parallax images can be presented in some cases by displaying #20, #18, #16, #14, #12, #10, #8, #6 and #4 parallax images instead of #19, #17, #15, #13, #11, #9, #7, #5 and #3 parallax images, as the left-side elemental images on the former half of one frame shown in FIG. 21.

According to the embodiments of the present invention, the parallax image display speed is doubled by using the double refraction prism array as heretofore described. Crosstalk between parallax images can be reduced by rotating the polarization direction fast at the same speed. In addition, the light ray density can be increased to twice while keeping the luminance substantially constant. And the displayable far-side range and nearside range can be increased to twice.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A stereoscopic image display apparatus comprising:
    a plane display device including a plurality of pixels arranged in a display surface;
    a lens array provided in front of the display surface to distribute light rays from the pixels to predetermined angles, the lens array having a plurality of lenses arranged in a first direction;
    a variable polarizer provided between the plane display device and the lens array to polarize light rays from the pixels; and
    a double refraction prism array provided on an opposite side of the lens array from the plane display device, the double refraction prism array including a plurality of double refraction prisms each having a ridge in a second direction perpendicular to the first direction and arranged in the first direction with a pitch which is substantially twice a lens pitch in the lens array, each of the double refraction prisms having double refraction in which a refractive index in the second direction is different from a refractive index in the first direction, wherein the double refraction prism array comprises:

a prism having a flat surface on an opposite side from the lens array and a surface on the lens array side provided with a groove which extends in the second direction and takes a triangular prism; and a double refraction substance inserted into the groove of the prism, and wherein when r is a curvature radius of a bottom part of a groove of the double refraction prism, t_top_prism is a distance between a surface of the prism of the lens array side and a vertex of the groove taking a shape of a triangular prism, t_lens is a thickness of a lens in the lens array, n is a refractive index of the prism, and θ is a half of a viewing angle, following expression is satisfied:

$$r=5\times(t\_top\_prism+t\_lens)\times\tan(\arcsin(\sin(\theta)/n)).$$

2. The apparatus according to claim 1, wherein when n is a refractive index of the prism, $\theta_{prism}$ is a base angle of the prism, $\theta_k$ is an incidence angle of a light ray incident on the double refraction prism, $\theta_{shift}(ne)$ is a projection angle of a light ray projected from the double refraction prism when the light ray incident on the double refraction prism is polarized in a major axis direction of the double refraction substance, ne is a refractive index of the double refraction substance in the major axis direction, no is a refractive index of the double refraction substance in the minor axis direction, N is the number of parallaxes, and θ is half of a viewing angle, the following expressions are satisfied;

$$|n-no|<0.1\times(ne-no)$$

$$0.4\leq 2\times N\times\tan\theta_{shift}(ne)/\tan\theta\leq 0.6$$

$$\theta_{shift}(ne)=A\sin(\sin(A\sin(\sin(A\sin(\sin\theta_k/ne)+\theta_{prism})\times ne/n)-\theta_{prism})\times n).$$

3. The apparatus according to claim 1, wherein when n is a refractive index of the prism, $\theta_{prism}$ is a base angle of the prism, $\theta_k$ is an incidence angle of a light ray incident on the double refraction prism, $\theta_{shift}(ne)$ is a projection angle of a light ray projected from the double refraction prism when the light ray incident on the double refraction prism is polarized in a major axis direction of the double refraction substance, $\theta_{shift}(no)$ is a projection angle of a light ray projected from the double refraction prism when the light ray incident on the double refraction prism is polarized in a minor axis direction of the double refraction substance, ne is a refractive index of the double refraction substance in the major axis direction, no is a refractive index of the double refraction substance in the minor axis direction, N is the number of parallaxes, and θ is half of a viewing angle, the following expressions are satisfied:

$$|n-ne|<0.1\times(ne-no)$$

$$-0.6<2\times N\times\tan\theta_{shift}(no)/\tan\theta\leq-0.4$$

$$\theta_{shift}(no)=A\sin(\sin(A\sin(\sin(A\sin(\sin\theta_k/no)+\theta_{prism})\times no/n)-\theta_{prism})\times n).$$

4. The apparatus according to claim 1, wherein when n is a refractive index of the prism, $\theta_{prism}$ is a base angle of the prism, $\theta_k$ is an incidence angle of a light ray incident on the double refraction prism, $\theta_{shift}(ne)$ is a projection angle of a light ray projected from the double refraction prism when the light ray incident on the double refraction prism is polarized in a major axis direction of the double refraction substance, $\theta_{shift}(no)$ is a projection angle of a light ray projected from the double refraction prism when the light ray incident on the double refraction prism is polarized in a minor axis direction of the double refraction substance, ne is a refractive index of the double refraction substance in the major axis direction, no is a refractive index of the double refraction substance in the minor axis direction, N is the number of parallaxes, and θ is half of a viewing angle, the following expressions are satisfied:

$$0.4\times(ne+no)\leq n\leq 0.6\times(ne+no)$$

$$0.4\leq\tan\theta/(4N)/(\tan\theta_{shift}(ne)-\tan\theta_{shift}(no))\leq 0.6$$

$$\theta_{shift}(ne)=A\sin(\sin(A\sin(\sin(A\sin(\sin\theta_k/ne)+\theta_{prism})\times ne/n)-\theta_{prism})\times n)$$

$$\theta_{shift}(no)=A\sin(\sin(A\sin(\sin(A\sin(\sin\theta_k/no)+\theta_{prism})\times no/n)-\theta_{prism})\times n).$$

5. The apparatus according to claim 1, wherein when lprism_p is a pitch of the double refraction prisms, t_top_prism is a distance between a surface of the prism of the lens array side and a vertex of the groove taking a shape of a triangular prism, t_lens is a thickness of a lens in the lens array, n is a refractive index of the prism, lp is a lens pitch in the lens array, and L is a distance between a vertex of the lens array and a viewer, the following expression is satisfied:

$$lprism\_p=(L-t\_top\_prism)\times lp\times 2/(L+t\_lens).$$

6. The apparatus according to claim 1, wherein the double refraction prism comprises:

a lower prism having a flat lower surface and an upper surface provided with a plurality of first grooves each taking a shape of a triangular prism;

an upper prism having a flat upper surface and a lower surface provided with a plurality of second grooves each taking a shape of a triangular prism with the same pitch as that of the first grooves so as to be opposed to the first grooves; and a double refraction substance provided between the opposed first grooves and second grooves.

7. The apparatus according to claim 6, wherein when lprism_p is a pitch of the double refraction prisms, L is a distance between a vertex of the lens array and a viewer, t_prism is a distance between the lower surface of the lower prism and the upper surface of the lower prism, lp is a lens pitch in the lens array, and t_lens is a thickness of a lens in the lens array, the following expression is satisfied:

$$lprism\_p=(L-t\_prism)\times lp\times 2/(L+t\_lens).$$

8. The apparatus according to claim 6, wherein when $n_{down}$ is a refractive index of the lower prism, $n_{up}$ is a refractive index of the upper prism, ne is a refractive index in a major axis direction of the double refraction substance, and no is a refractive index in a minor axis direction of the double refraction substance, the following expression is satisfied:

$$0.4\times(ne+no)\leq n_{up}=n_{down}\leq 0.6\times(ne+no).$$

9. A stereoscopic image display apparatus comprising:

a plane display device including a plurality of pixels arranged in a display surface;

a lens array provided in front of the display surface to distribute light rays from the pixels to predetermined angles, the lens array having a plurality of lenses arranged in a first direction;

a double refraction prism array provided on an opposite side of the lens array from the plane display device, the double refraction prism array including a plurality of double refraction prisms each having a ridge in a second direction perpendicular to the first direction and arranged in the first direction with a pitch which is substantially twice a lens pitch in the lens array, each of the double refraction prisms having double refraction in which a refractive index in the second direction is different from a refractive index in the first direction; and a first variable polarizer provided on an opposite side of the double refraction prism array from the lens array to polarize light rays from the double refraction prism array, wherein the double refraction prism comprises:

a prism having a flat surface on an opposite side from the lens array and a surface on the lens array side provided with a groove which extends in the second direction and takes a triangular prism; and a double refraction substance inserted into the groove of the prism, and wherein when r is a curvature radius of a bottom part of a groove of the double refraction prism, t_top_prism is a distance between a surface of the prism of the lens array side and a vertex of the groove taking a shape of a triangular prism, t_lens is a thickness of a lens in the lens array, n is a refractive index of the prism, and θ is a half of a viewing angle, following expression is satisfied:

$r=5\times(t\_top\_prism+t\_lens)\times\tan(\arcsin(\sin(\theta)/n))$.

10. The apparatus according to claim 9, wherein the plane display device is a liquid crystal display device having a backlight, and the stereoscopic image display apparatus further comprises a second variable polarizer to polarize light rays from the backlight.

11. The apparatus according to claim 9, wherein when n is a refractive index of the prism, $\theta_{prism}$ is a base angle of the prism, $\theta_k$ is an incidence angle of a light ray incident on the double refraction prism, $\theta_{shift}(ne)$ is a projection angle of a light ray projected from the double refraction prism when the light ray incident on the double refraction prism is polarized in a major axis direction of the double refraction substance, ne is a refractive index of the double refraction substance in the major axis direction, no is a refractive index of the double refraction substance in the minor axis direction, N is the number of parallaxes, and θ is half of a viewing angle, the following expressions are satisfied:

$|n-no|<0.1\times(ne-no)$ $0.4\leq 2\times N\times\tan\theta_{shift}(ne)/\tan\theta\leq 0.6$ $\theta_{shift}(ne)=A\sin(\sin(A\sin(\sin(A\sin(\sin\theta_k/ne)+\theta_{prism})\times ne/n)-\theta_{prism})\times n)$.

12. The apparatus according to claim 9, wherein when n is a refractive index of the prism, $\theta_{prism}$ is a base angle of the prism, $\theta_k$ is an incidence angle of a light ray incident on the double refraction prism, $\theta_{shift}(ne)$ is a projection angle of a light ray projected from the double refraction prism when the light ray incident on the double refraction prism is polarized in a major axis direction of the double refraction substance, $\theta_{shift}(no)$ is a projection angle of a light ray projected from the double refraction prism when the light ray incident on the double refraction prism is polarized in a minor axis direction of the double refraction substance, ne is a refractive index of the double refraction substance in the major axis direction, no is a refractive index of the double refraction substance in the minor axis direction, N is the number of parallaxes, and θ is half of a viewing angle, the following expressions are satisfied:

$|n-ne|<0.1\times(ne-no)$ $-0.6<2\times N\times\tan\theta_{shift}(no)/\tan\theta\leq -0.4$ $\theta_{shift}(no)=A\sin(\sin(A\sin(\sin(A\sin(\sin\theta_k/no)+\theta_{prism})\times no/n)-\theta_{prism})\times n)$.

13. The apparatus according to claim 9, wherein when n is a refractive index of the prism, $\theta_{prism}$ is a base angle of the prism, $\theta_k$ is an incidence angle of a light ray incident on the double refraction prism, $\theta_{shift}(ne)$ is a projection angle of a light ray projected from the double refraction prism when the light ray incident on the double refraction prism is polarized in a major axis direction of the double refraction substance, $\theta_{shift}(no)$ is a projection angle of a light ray projected from the double refraction prism when the light ray incident on the double refraction prism is polarized in a minor axis direction of the double refraction substance, ne is a refractive index of the double refraction substance in the major axis direction, no is a refractive index of the double refraction substance in the minor axis direction, N is the number of parallaxes, and θ is half of a viewing angle, the following expressions are satisfied:

$0.4\times(ne+no)\leq n\leq 0.6\times(ne+no)$ $0.4\leq\tan\theta/(4N)/(\tan\theta_{shift}(ne)-\tan\theta_{shift}(no))\leq 0.6$ $\theta_{shift}(ne)=A\sin(\sin(A\sin(\sin(A\sin(\sin\theta_k/ne)+\theta_{prism})\times ne/n)-\theta_{prism})\times n)$ $\theta_{shift}(no)=A\sin(\sin(A\sin(\sin(A\sin(\sin\theta_k/no)+\theta_{prism})\times no/n)-\theta_{prism})\times n)$.

14. The apparatus according to claim 9, wherein when lprism_p is a pitch of the double refraction prisms, t_top_prism is a distance between a surface of the prism of the lens array side and a vertex of the groove taking a shape of a triangular prism, t_lens is a thickness of a lens in the lens array, n is a refractive index of the prism, lp is a lens pitch in the lens array, and L is a distance between a vertex of the lens array and a viewer, the following expressions is satisfied:

$lprism\_p=(L-t\_top\_prism)\times lp\times 2/(L+t\_lens)$.

15. The apparatus according to claim 9, wherein the double refraction prism comprises:

a lower prism having a flat lower surface and an upper surface provided with a plurality of first grooves each taking a shape of a triangular prism;

an upper prism having a flat upper surface and a lower surface provided with a plurality of second grooves each taking a shape of a triangular prism with the same pitch as that of the first grooves so as to be opposed to the first grooves; and a double refraction substance provided between the opposed first grooves and second grooves.

16. The apparatus according to claim 15, wherein when lprism_p is a pitch of the double refraction prisms, L is a distance between a vertex of the lens array and a viewer, t_prism is a distance between the lower surface of the lower prism and the upper surface of the lower prism, lp is a lens pitch in the lens array, and t_lens is a thickness of a lens in the lens array, the following expression is satisfied:

$$l\text{prism}\_p = (L - t\_\text{prism}) \times lp \times 2/(L + t\_\text{lens}).$$

17. The apparatus according to claim 15, wherein when $n_{down}$ is a refractive index of the lower prism, $n_{up}$ is a refractive index of the upper prism, ne is a refractive index in a major axis direction of the double refraction substance, and no is a refractive index in a minor axis direction of the double refraction substance, the following expression is satisfied:

$$0.4 \times (ne + no) \leq n_{up} = n_{down} \leq 0.6 \times (ne + no).$$

* * * * *